United States Patent
Covington

(10) Patent No.: US 10,526,055 B2
(45) Date of Patent: *Jan. 7, 2020

(54) APPARATUS AND METHODS FOR RECOVERING ONE OR MORE CONTAMINANTS FROM A BODY OF WATER

(71) Applicant: Ocean Cleaner, LLC, Orange, TX (US)

(72) Inventor: Russell S. Covington, Orange, TX (US)

(73) Assignee: Ocean Cleaner, LLC, Orange, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,724

(22) Filed: Apr. 20, 2017

(65) Prior Publication Data
US 2017/0217547 A1    Aug. 3, 2017

Related U.S. Application Data

(63) Continuation-in-part of application No. 14/881,394, filed on Oct. 13, 2015, now Pat. No. 9,643,692.

(60) Provisional application No. 62/064,776, filed on Oct. 16, 2014.

(51) Int. Cl.
| | | |
|---|---|---|
| *E02B 15/04* | (2006.01) | |
| *B63B 35/32* | (2006.01) | |
| *C02F 1/40* | (2006.01) | |
| *C02F 103/00* | (2006.01) | |

(52) U.S. Cl.
CPC ........... *B63B 35/32* (2013.01); *C02F 1/40* (2013.01); *E02B 15/046* (2013.01); *E02B 15/048* (2013.01); *C02F 2103/007* (2013.01)

(58) Field of Classification Search
CPC .... E02B 15/046; E02B 15/047; E02B 15/048; E02B 15/085; B63B 35/32
USPC ... 210/170.05, 170.09, 170.11, 242.3, 747.6, 210/776, 923, 242.1
See application file for complete search history.

(56) References Cited

U.S. PATENT DOCUMENTS

| | | |
|---|---|---|
| 1,591,024 A | 7/1926 | Dodge |
| 2,891,672 A | 6/1959 | Veld et al. |
| 3,667,235 A | 6/1972 | Preus et al. |
| 3,688,506 A * | 9/1972 | Marcocchio .......... E02B 15/048 210/242.3 |
| 3,701,430 A | 10/1972 | Tuttle |

(Continued)

FOREIGN PATENT DOCUMENTS

| | | |
|---|---|---|
| EP | 0005411 | * 11/1979 |
| GB | 2287000 A | 9/1995 |

(Continued)

OTHER PUBLICATIONS

Ecooceane Products, http://ecooceane.com/products/, 7 pp.

(Continued)

*Primary Examiner* — Christopher Upton
(74) *Attorney, Agent, or Firm* — E. Randall Smith; E. Randall Smith, PC

(57) ABSTRACT

Apparatus, systems and methods for collecting debris from a body of water on a vessel include at least one inflow regulator (IFR) configured to be selectively actuated to adjust the height of at least a portion thereof relative to the surface of liquid in the vessel during debris collection operations.

21 Claims, 22 Drawing Sheets

(56) References Cited

U.S. PATENT DOCUMENTS

| | | | |
|---|---|---|---|
| 3,708,070 A * | 1/1973 | Bell | E02B 15/046 |
| | | | 210/242.3 |
| 3,847,816 A | 11/1974 | DiPerna | |
| 3,923,661 A * | 12/1975 | Crisafulli | E02B 15/106 |
| | | | 210/242.3 |
| 3,926,812 A | 12/1975 | Neal | |
| 3,970,556 A * | 7/1976 | Gore | E02B 15/106 |
| | | | 210/242.1 |
| 3,983,034 A | 9/1976 | Wilson | |
| 4,033,876 A | 7/1977 | Cocjin et al. | |
| 4,054,525 A | 10/1977 | Propp | |
| 4,120,793 A | 10/1978 | Strain | |
| 4,211,659 A | 7/1980 | Nyfeld et al. | |
| 4,264,444 A | 4/1981 | Bronnec | |
| 4,308,140 A | 12/1981 | Pierson, Jr. | |
| 4,372,854 A * | 2/1983 | Szereday | E02B 15/106 |
| | | | 210/242.3 |
| 4,381,994 A | 5/1983 | Ayers | |
| 4,545,315 A | 10/1985 | Becherer | |
| 4,554,070 A * | 11/1985 | Jordan | E02B 15/048 |
| | | | 210/242.3 |
| 4,851,133 A * | 7/1989 | Rymal | E02B 15/046 |
| | | | 210/242.3 |
| 4,959,143 A | 9/1990 | Koster | |
| 5,043,065 A | 8/1991 | Propp | |
| 5,047,156 A | 9/1991 | Sullivan | |
| 5,102,540 A | 4/1992 | Conradi et al. | |
| 5,108,591 A * | 4/1992 | Hagan | E02B 15/106 |
| | | | 210/242.3 |
| 5,194,151 A | 3/1993 | Broussard | |
| 5,215,654 A * | 6/1993 | Karterman | E02B 15/046 |
| | | | 210/242.3 |
| 5,292,430 A | 3/1994 | Sullivan | |
| 5,308,510 A * | 5/1994 | Gore | E02B 15/048 |
| | | | 210/242.3 |
| 5,378,376 A * | 1/1995 | Zenner | B01D 21/22 |
| | | | 210/242.1 |
| 5,688,075 A | 11/1997 | Gradek | |
| 5,893,978 A | 4/1999 | Yoda et al. | |
| 8,318,012 B2 | 11/2012 | Dragna | |
| 9,643,692 B2 * | 5/2017 | Covington | B63B 35/32 |
| 2003/0132154 A1 | 7/2003 | Morin | |
| 2013/0032524 A1 | 2/2013 | Dragna | |
| 2014/0165894 A1 | 6/2014 | Gastaldi et al. | |

FOREIGN PATENT DOCUMENTS

| | | |
|---|---|---|
| WO | 95/21764 A1 | 8/1995 |
| WO | 2014158391 A1 | 10/2014 |

OTHER PUBLICATIONS

Oil Spill Recover Europe Ltd., YouTube video demonstration page and company information, 7 pp.

Patzek, Tad W., "Energy and Environment Subcommittee of the Energy and Commerce Committee Jun. 9, 2010 Briefing", Jun. 8, 2010, 16 pp.

"Oil Skimmer 'The Big Gulp'", 2 pages, News Item Reported by Fox News 8, John Snell, Anchor, http://ladcompanies.com/index.php/home/news/101-oil-skimmer-qthe-big-gulpq.html, 2 pp.

"Oil Whale How it Works", Copyright 2016 by Oilwhale Oy, http://www.oilwhale.fi/how-it-works/, 5 pp.

* cited by examiner

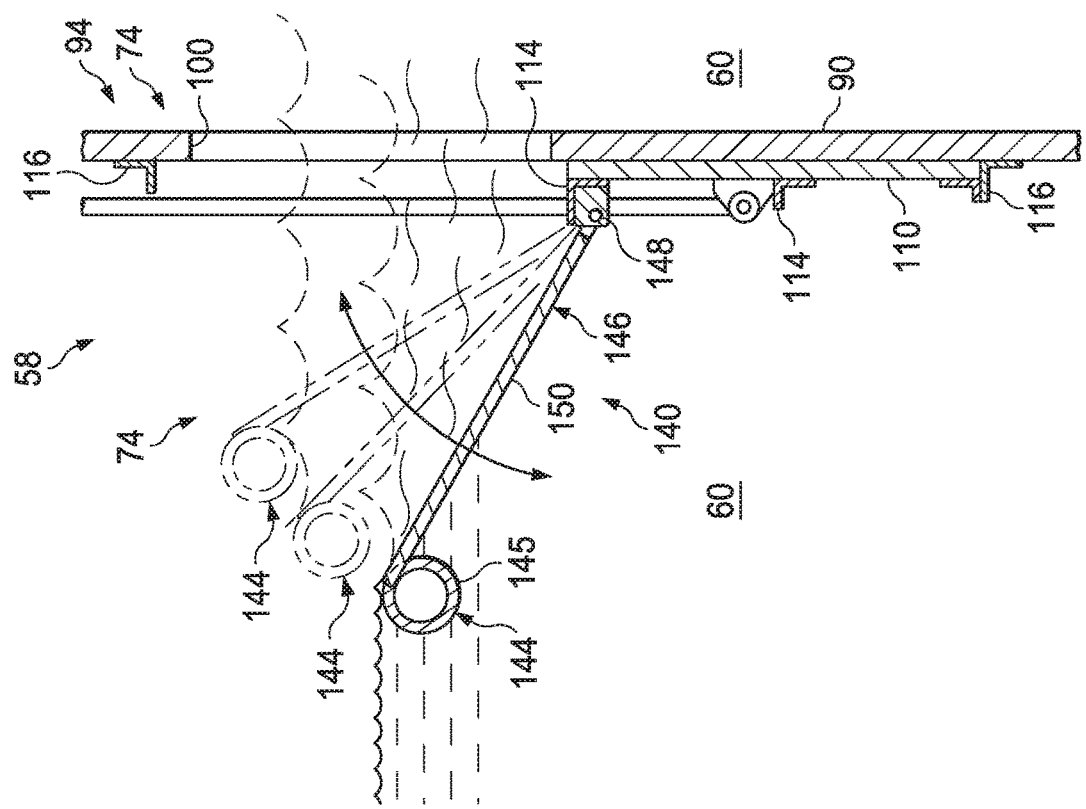
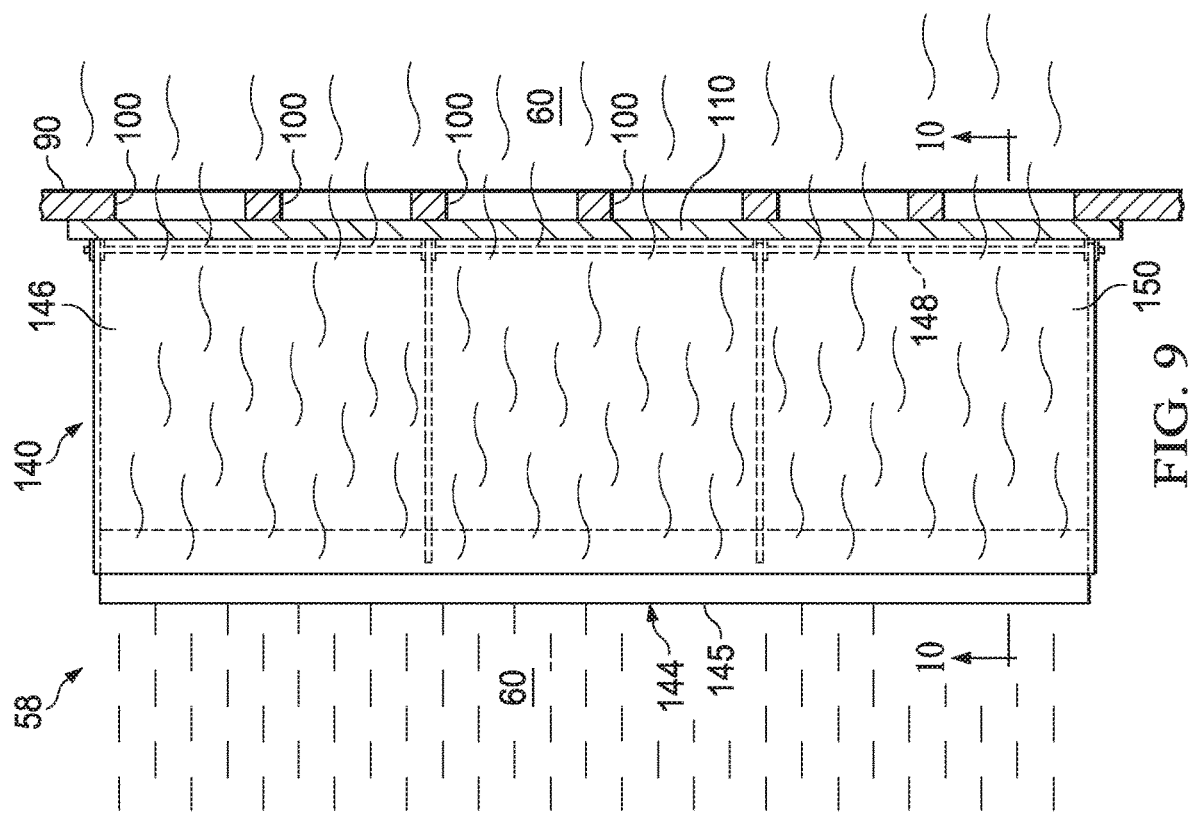

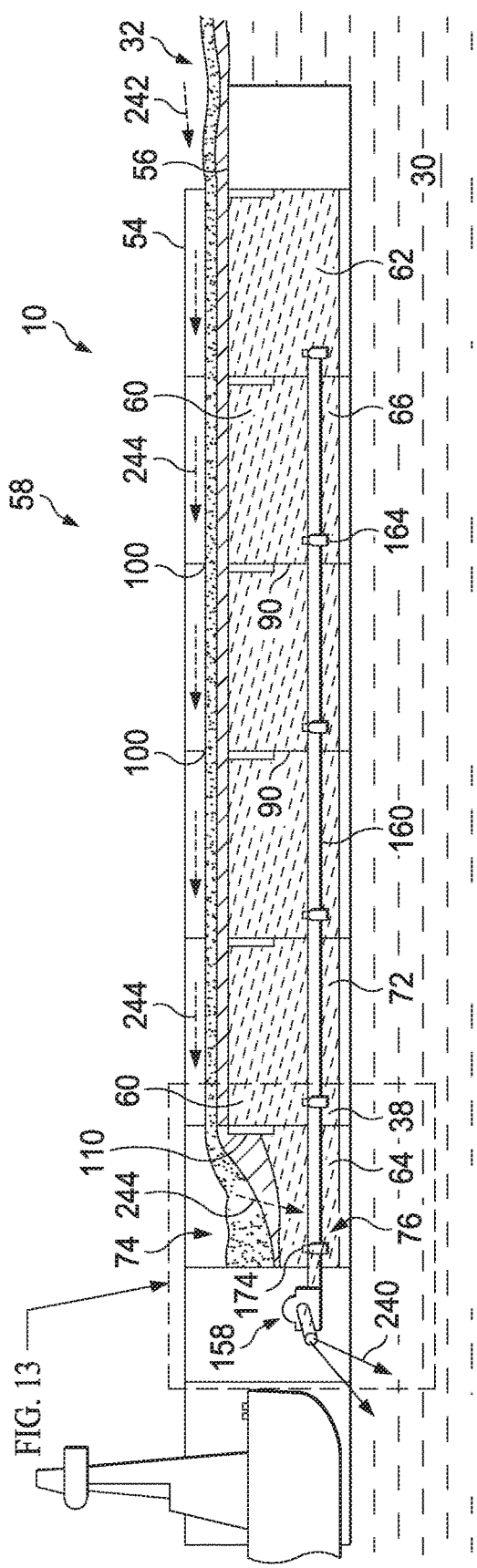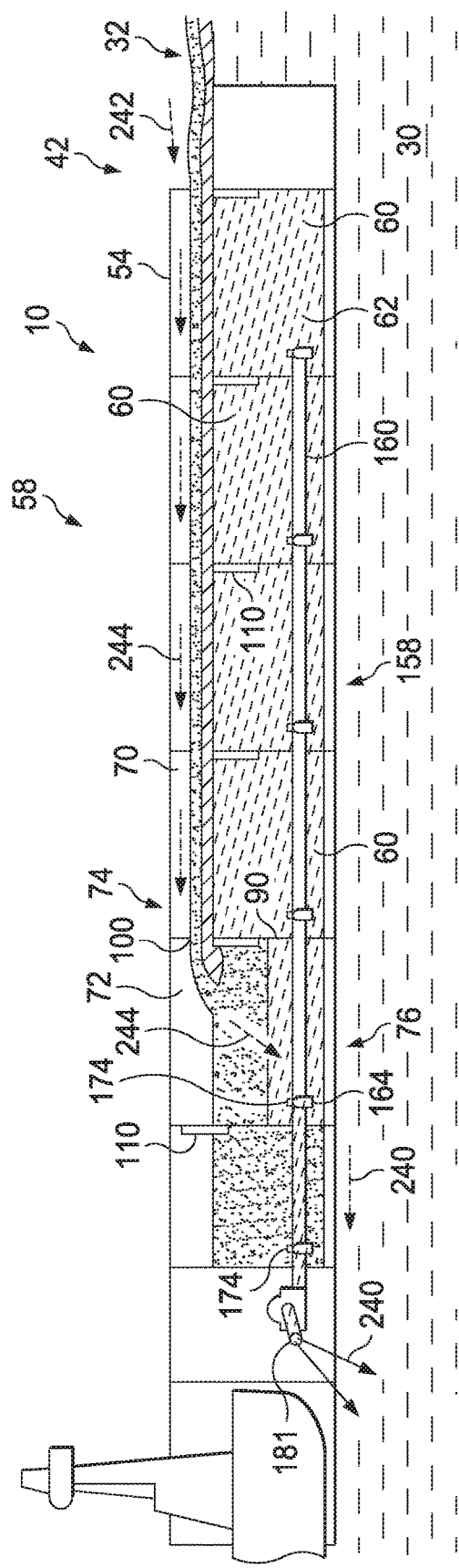

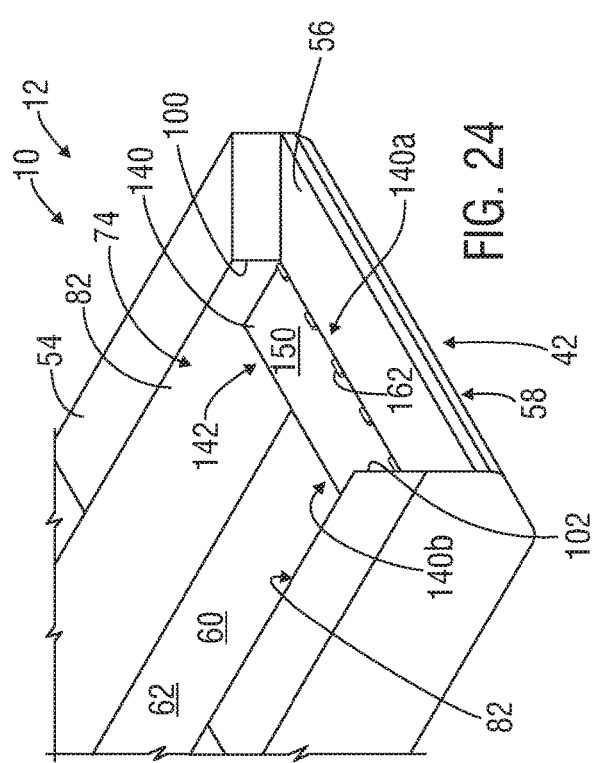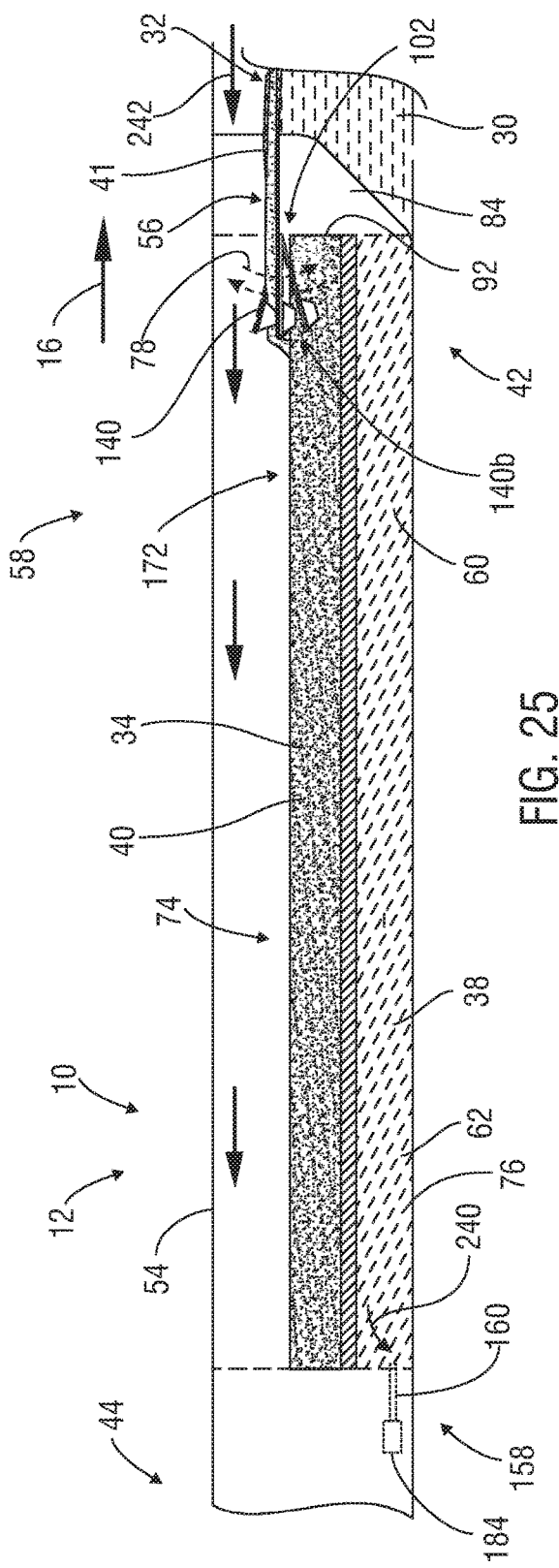

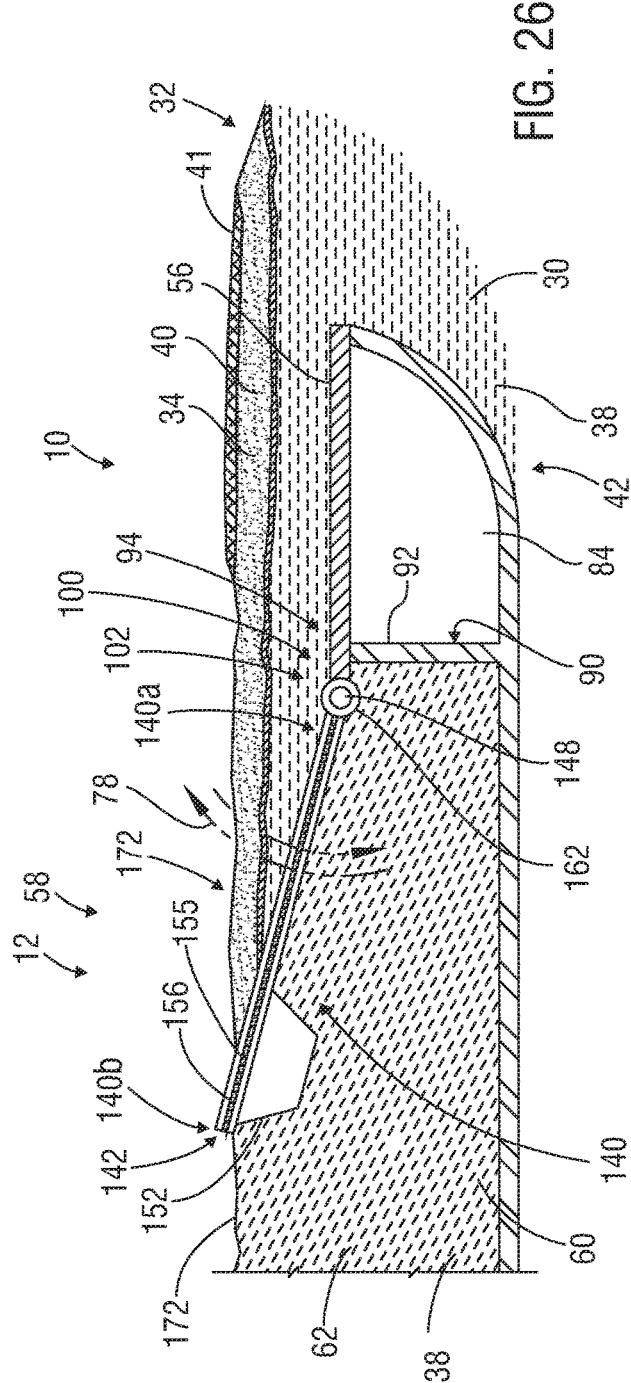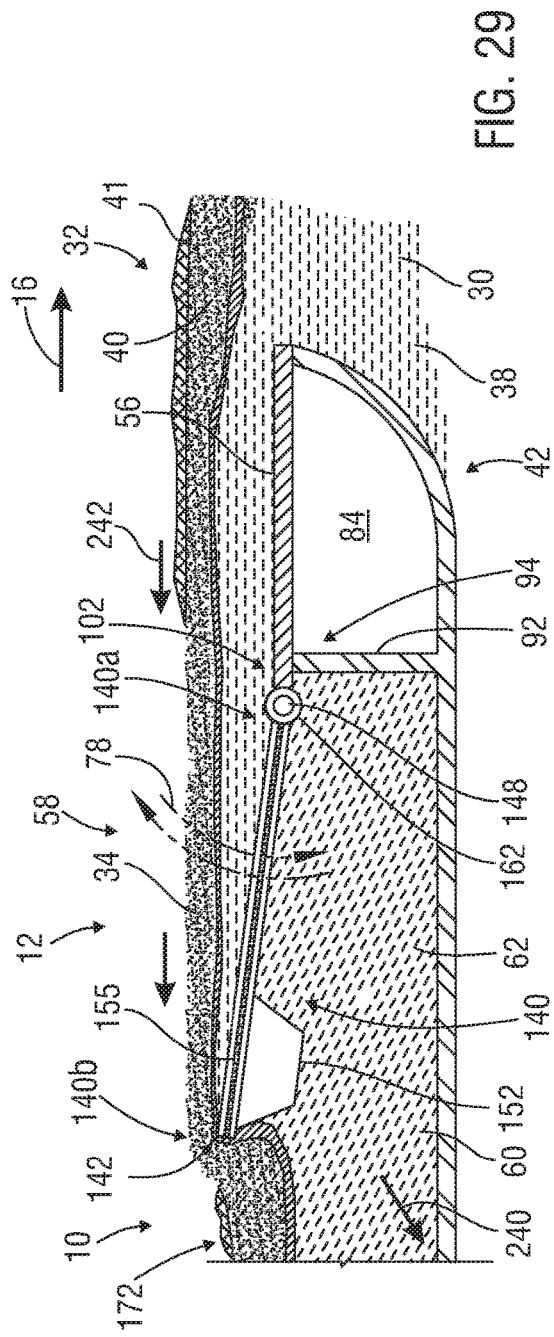

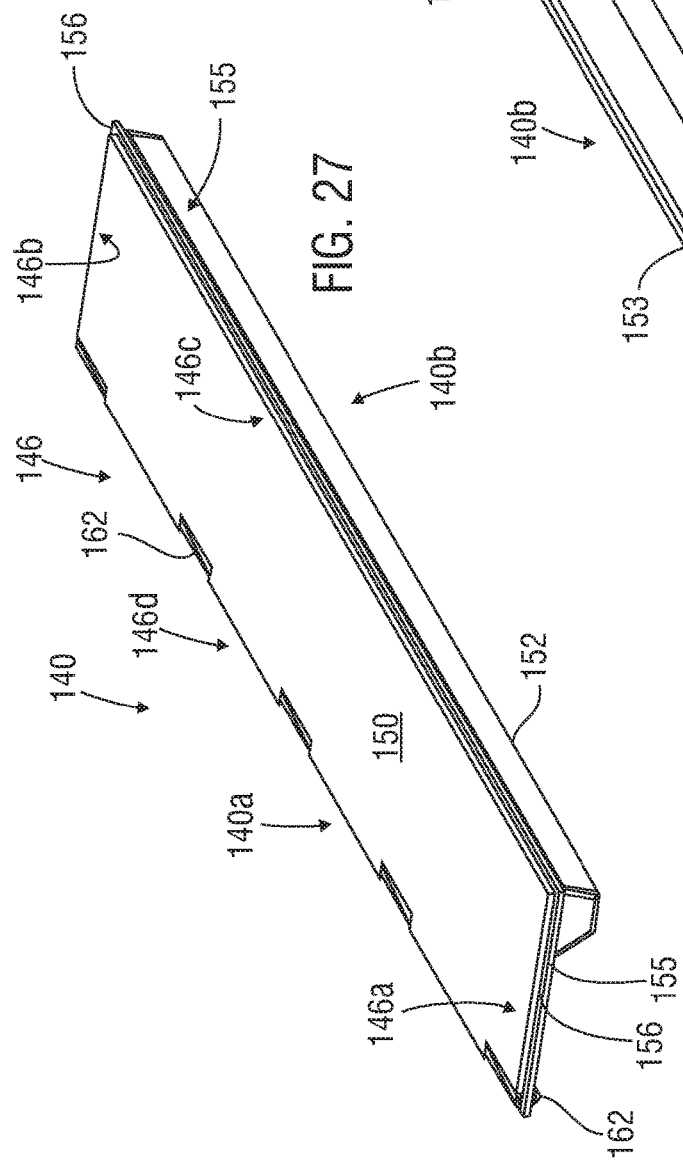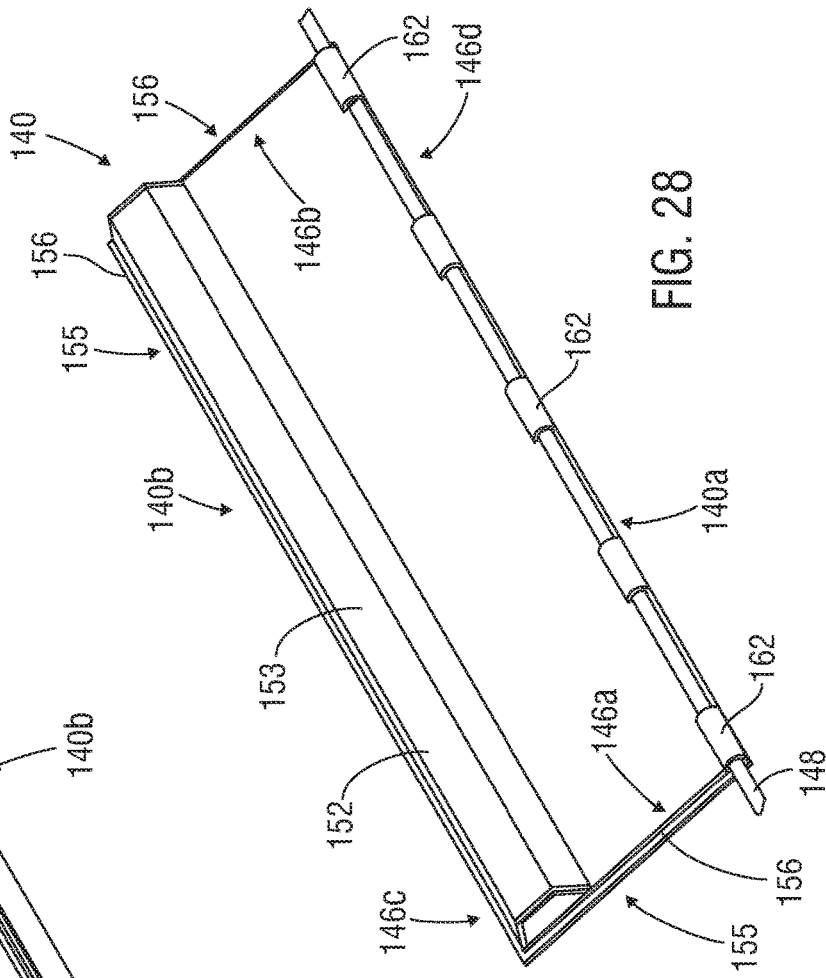

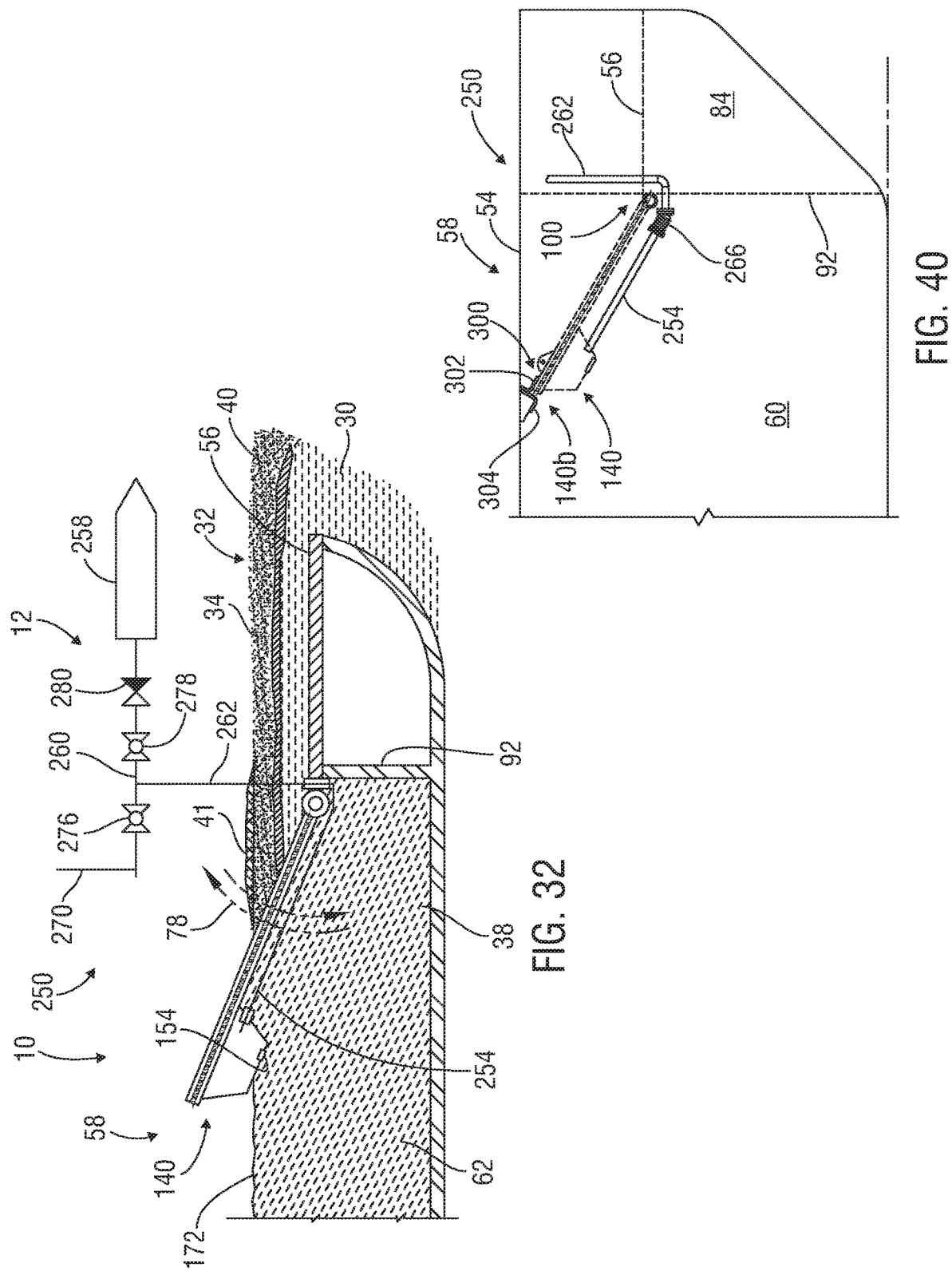

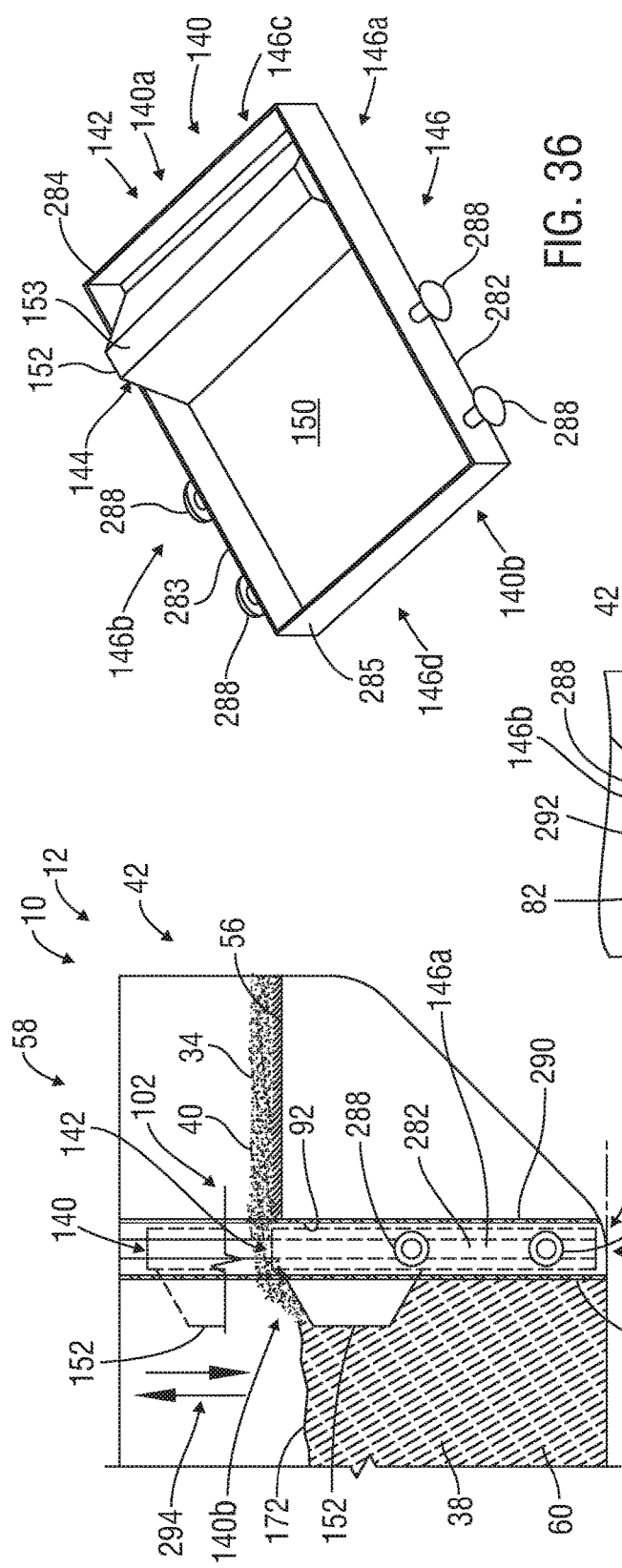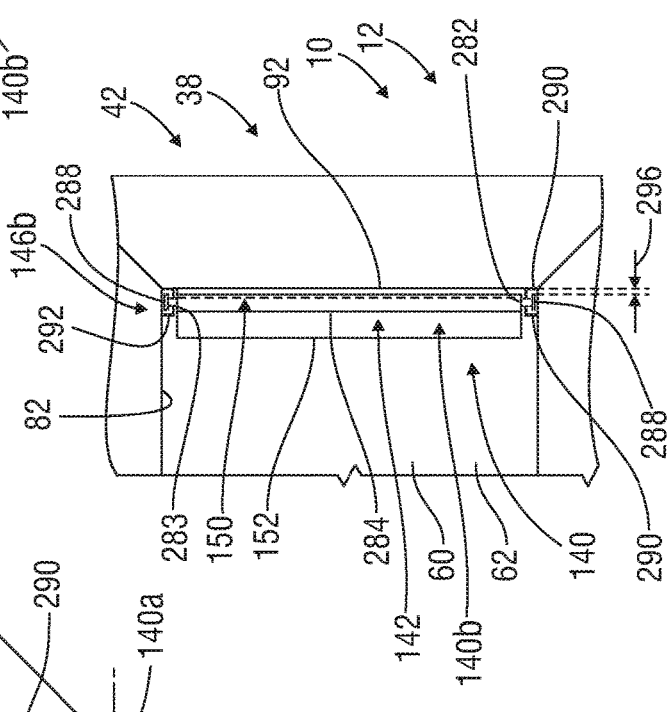

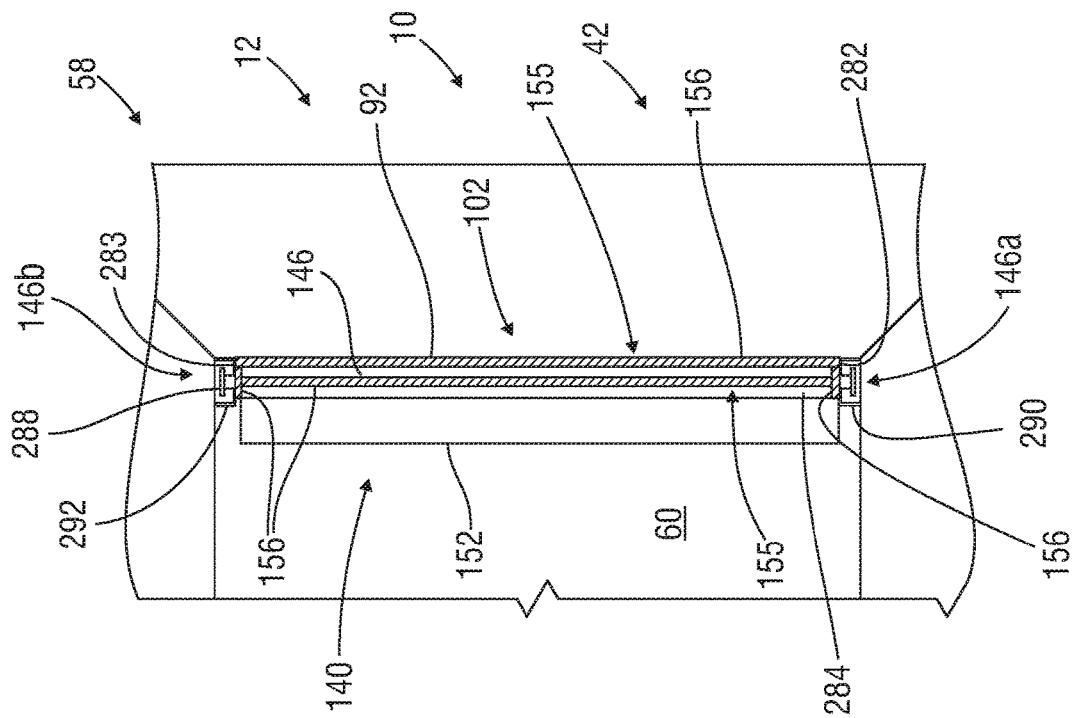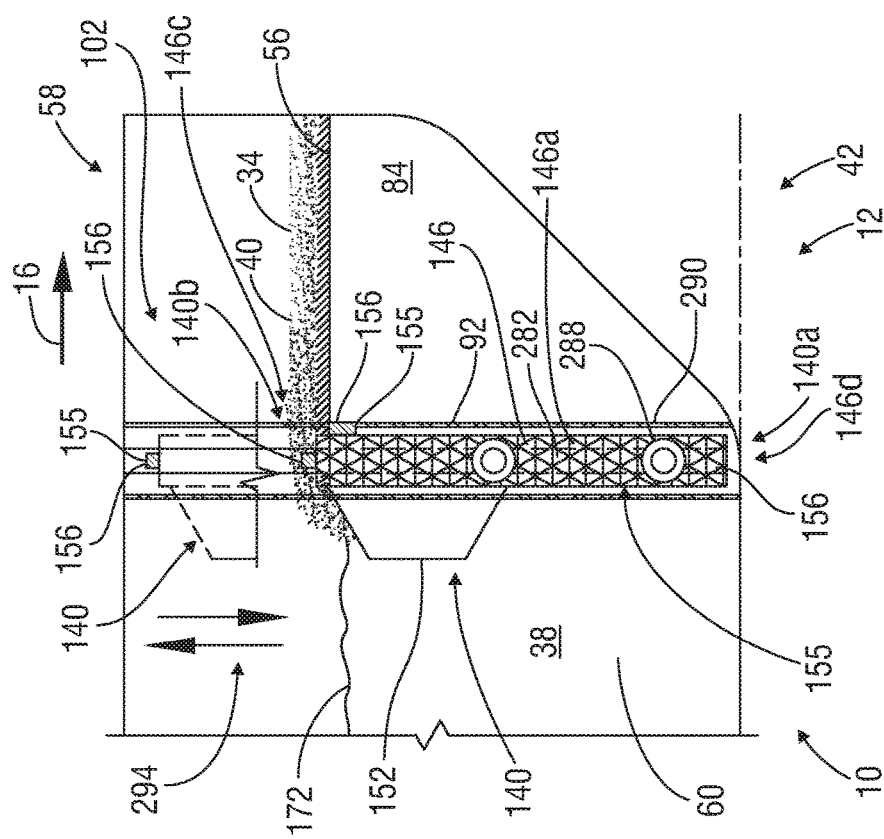

APPARATUS AND METHODS FOR RECOVERING ONE OR MORE CONTAMINANTS FROM A BODY OF WATER

CROSS REFERENCE TO RELATED APPLICATIONS

The present application is a continuation-in-part application of and claims priority to U.S. patent application Ser. No. 14/881,394 filed on Oct. 13, 2015 and entitled "Apparatus and Methods for Recovering Oil from a Body of Water", which claims priority to U.S. Provisional Patent Application Ser. No. 62/064,776, filed on Oct. 16, 2014 and entitled "System, Apparatus and Methods for Collecting Debris from a Body of Water", both of which are hereby incorporated by reference herein in their entireties.

FIELD OF THE DISCLOSURE

The present disclosure relates generally to recovering floating debris or contaminants from a body of water.

BACKGROUND

Historically, it has proven difficult to effectively and efficiently remove substantial amounts of floating debris, or contaminants, from the ocean and other bodies of water. Some variables that may hinder such recovery efforts include the large amount of debris often needed to be recovered, the different types of debris, the rapid speed at which the debris spreads, the effect of wind, waves, rough seas and other environmental factors on the recovery operations and the limited size and/or capacity of existing recovery vessels. Presently available debris recovery vessels and techniques are thus believed to have one or more limitations or disadvantages.

For example, presently known vessels being used or promoted to collect waterborne debris are typically unable to efficiently and/or effectively collect different types of debris. For another example, in the offshore and inland waterway oil spill recovery arena, various existing oil skimmers are believed to be unable to recover large volumes of oil. Many and perhaps all known systems cannot separate out significant amounts (or any) of the collected oil from sea water, resulting in limited on-board oil storage and, thus, oil recovery capacity. In fact, many existing systems cause further emulsification of the oil and water and thus cannot return separated water back to the sea or other body of water, limiting on-board oil storage capacity, increasing cost and time, etc. Other existing oil skimmers attempt to separate the recovered oil from sea water, but are slow and thus largely ineffective at recovering substantial volumes of oil.

It should be understood that the above-described features, capabilities, limitations and disadvantages are provided for illustrative purposes only and are not intended to limit the scope or subject matter of the appended claims or those of any related patent application or patent. Thus, none of the appended claims or claims of any related application or patent should be limited by the above discussion or construed to address, include or exclude each or any of the above-cited features, capabilities or disadvantages merely because of their mention above.

Accordingly, there exists a need for improved systems, apparatus and methods useful in connection with debris recovery operations having one or more of the attributes or capabilities described or shown in, or as may be apparent from, this patent.

BRIEF SUMMARY OF THE DISCLOSURE

In various embodiments, the present disclosure includes a system useful for collecting debris from a body of water on a vessel moveable in the body of water. The vessel includes at least one cargo compartment and at least one intake opening fluidly coupling the at least one cargo compartment with the body of water during debris collection operations. The system includes at least one discharge pump having sufficient pumping capacity both when the vessel is moving and stationary to concurrently (i) draw water and debris from the body of water, through the at least one intake opening and into the at least one cargo compartment and (ii) remove water and little or no debris from the at least one cargo compartment. At least one inflow regulator can at least partially free-float at or near the surface of liquid in the vessel and limit the water and debris drawn from the body of water into the at least one cargo compartment to primarily debris and water that passes over the at least one buoyant portion during debris collection operations. The at least one inflow regulator can also be selectively actuated to adjust the height of at least a portion thereof relative to the surface of liquid in the vessel during debris collection operations.

In many embodiments, the present disclosure involves methods of collecting debris from a body of water onto a vessel moveable in the body of water and having at least one intake opening fluidly coupling at least one cargo compartment of the vessel with the body of water. At least one discharge pump on the vessel is selectively actuatable, both when the vessel is moving and stationary, to concurrently (i) draw water and debris from the body of water, through the at least one intake opening and into the at least one cargo compartment and (ii) remove water and little or no debris from the at least one cargo compartment. At least one buoyant portion of at least one inflow regulator on the vessel free-floats at or near the surface of liquid in the vessel. The at least one inflow regulator limits the water and debris drawn from the body of water into the cargo compartment to primarily debris and water that passes over the at least one buoyant portion of the at least one inflow regulator during debris collection operations. The at least one inflow regulator is selectively actuatable to adjust the height of the at least one buoyant portion thereof relative to the surface of liquid in the vessel during debris collection operations.

It should be noted that the use of "(s)" in reference to an item, component or action (e.g. "surface(s)") throughout this patent should be construed to mean "at least one" of the referenced item, component or act.

In some embodiments, the present disclosure involves apparatus, methods and systems useful for collecting debris (and some water) from a body of water at or near the surface of the body of water onto a waterborne vessel. The vessel has front and rear ends and is positionable at or near the surface of the body of water. The vessel includes at least a first cargo compartment in fluid communication with the body of water and configured to contain water and debris. At least one bulkhead is disposed on the vessel between the first cargo compartment and the front end of the vessel. At least one intake opening is disposed adjacent to or formed in the bulkhead(s) and fluidly couples the first cargo compartment and the body of water. At least a first, at least partially buoyant, inflow regulator is disposed at least partially in the first cargo compartment proximate to the intake opening(s).

The inflow regulator has a front end and a rear end and extends at least partially across the width of the first cargo compartment. The inflow regulator is sufficiently buoyant so that when the first cargo compartment at least partially contains water, the front end thereof floats at or near the surface of the water in the first cargo compartment and limits the inflow of debris (and some) water from the body of water into the first cargo compartment to debris and water disposed at or near the surface of the body of water and which flows over the inflow regulator during use of the system. At least one suction conduit is disposed on the vessel and fluidly coupled to the first cargo compartment. At least one discharge pump is disposed on the vessel and fluidly coupled to at least one suction conduit. When one or more discharge pumps are actuated during use of the system, it/they will create suction in at least one suction conduit to concurrently (i) draw debris and water from the body of water through the intake opening(s) over at least one inflow regulator into the first cargo compartment and (ii) draw water from the first cargo compartment into at least one suction conduit.

Accordingly, the present disclosure includes features and advantages which are believed to enable it to advance debris recovery technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 9 is a top view of an exemplary wave dampener within an exemplary cargo compartment of the vessel of FIG. 1 in accordance with an embodiment of the present disclosure;

FIG. 10 is a side, cross-sectional view of the exemplary wave dampener of FIG. 9 taken along lines 10-10;

FIG. 12 is a side view of the exemplary vessel of FIG. 1 with the side shell removed to show exemplary interior cargo compartments and other components during exemplary debris recovery operations in accordance with an embodiment of the present disclosure;

FIG. 14 is a side view of the exemplary vessel of FIG. 1 with the side shell removed to show exemplary interior cargo compartments and other components during exemplary debris recovery operations in accordance with an embodiment of the present disclosure;

FIG. 24 is an isolated perspective view of part of the front end of the exemplary vessel and debris recovery system of FIG. 23;

FIG. 25 is a side view of the exemplary vessel of FIG. 24 with the side shell removed and showing the exemplary interior cargo compartment and inflow regulator in accordance with at least one embodiment of the present disclosure;

FIG. 26 is side, partial cross-sectional, view of part of the exemplary vessel of FIG. 23 with the side shell removed and showing the exemplary inflow regulator in an exemplary rest position;

FIG. 27 is a perspective view of the exemplary inflow regulator of FIG. 26;

FIG. 28 is another perspective view of the exemplary inflow regulator of FIG. 26 showing its underside;

FIG. 29 is side, partial cross-sectional, view of part of the exemplary vessel of FIG. 23 with the side shell removed and showing the exemplary inflow regulator in an exemplary operating position;

FIG. 32 is a side, partial cross-sectional, view of the exemplary waterborne vessel of FIG. 23 with the side shell removed and the exemplary debris recovery system including the exemplary variable buoyancy system of FIG. 30 and showing the exemplary inflow regulator in an exemplary rest position in accordance with one or more embodiments of the present disclosure;

FIG. 35 is a side, cut-away view of part of the exemplary waterborne vessel of FIG. 23 with the side shell removed and including an exemplary debris recovery system having an exemplary sliding-type inflow regulator and not including any associated exemplary sealing members in accordance with one or more embodiments of the present disclosure;

FIG. 36 is a perspective view of the exemplary sliding-type inflow regulator of FIG. 35;

FIG. 37 is a plan view of part of the exemplary debris recovery system shown in FIG. 35;

FIG. 38 is a side, cut-away view of part of the exemplary waterborne vessel of FIG. 23 with the side shell removed and including the exemplary debris recovery system of FIG. 35 with exemplary seal members in accordance with one or more embodiments of the present disclosure;

FIG. 39 is a plan view of part of the exemplary debris recovery system shown in FIG. 38; and FIG. 40 is a side, cut-away view of part of the exemplary waterborne vessel of FIG. 23 with the side shell removed and the exemplary debris recovery system including an exemplary variable buoyancy system and an exemplary IFR catcher in accordance with one or more embodiments of the present disclosure.

DETAILED DESCRIPTION OF PRESENTLY PREFERRED EMBODIMENTS

Figure 1:
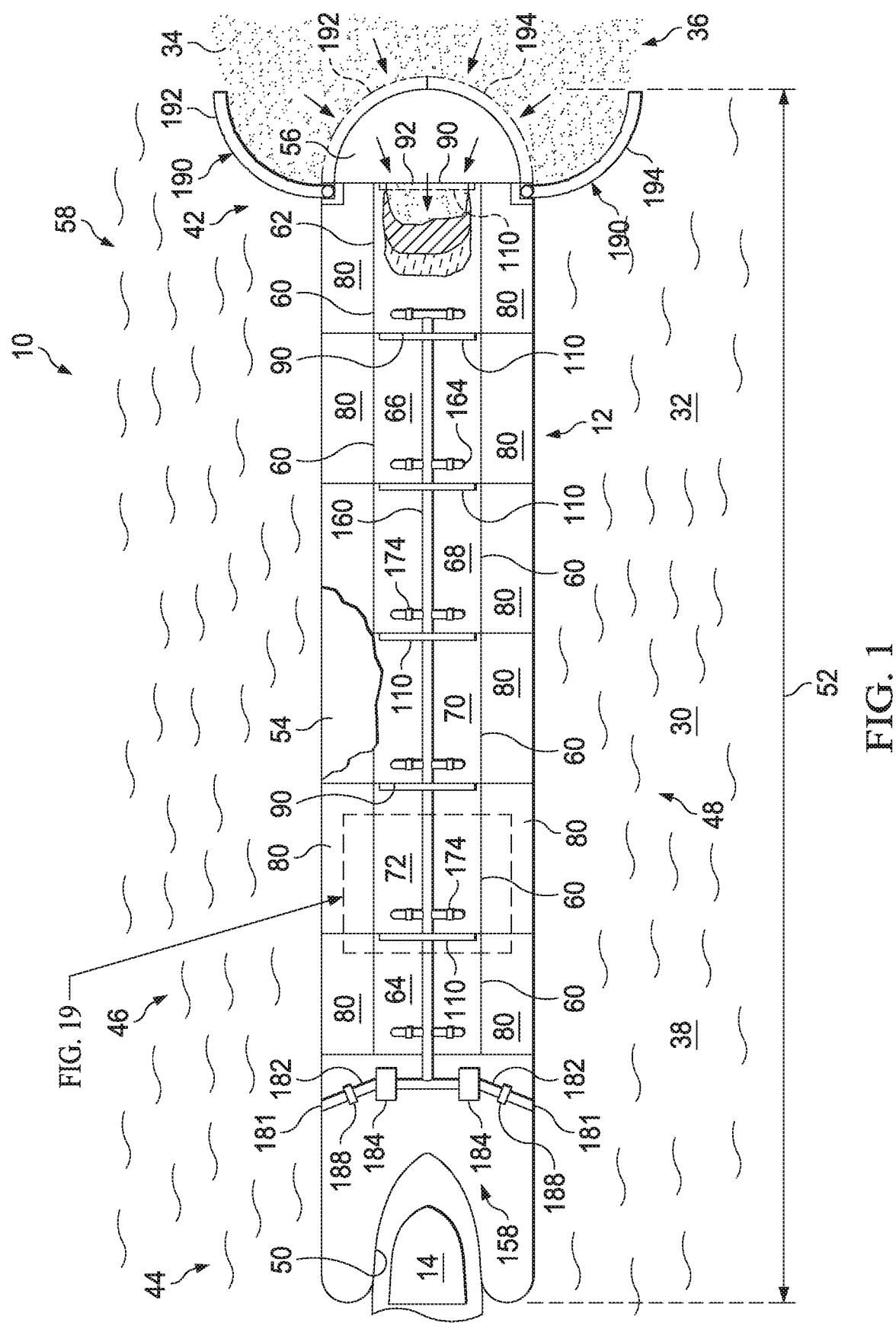
FIG. 1 is a top view of an exemplary debris recovery vessel in accordance with an embodiment of the present disclosure.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an exemplary debris recovery vessel 10 in accordance with an embodiment of the present disclosure is shown in a body of water 30. In this example, the debris to be recovered is a contaminant, such as floating oil 34. However, the vessel 10 may be used to recover any other form of floating contaminants or debris. It should be noted, the terms "debris" and "contaminant" are used interchangeably herein. In other words, the "debris" being recovered may sometimes be referred to herein as a "contaminant", whether or not it actually formally contaminates the body of water 30. For example, the debris may include one or more substances, materials or a combination thereof, such as floating chemicals and particulate pollutants (e.g. plastic debris and micro plastics as presently found in the Great Pacific Garbage Patch). Moreover, the present disclosure and appended claims are not limited to by type of debris or contaminants, unless and only to the extent as may be expressly provided in a particular claim and only for that claims and other claims depending therefrom. For example, the debris collected or recovered may include large debris The vessel 10 may be arranged and adapted to be used in any type of body of water 30. For example, the body of water 30 may be any inland or offshore waterway, such as a sea or ocean, bay, sound, inlet, river, lake, canal or the like. The nature and type of the body of water 30 is not limiting upon the present disclosure. For convenience, the water in the body of water 30 is referred to herein as "sea water" 38, even though it may not actually be sea water, depending upon the type of body of water 30. For example, in some cases, the "sea water 38" as referenced herein may be fresh water from an inland body of water, such as a lake.

The illustrated vessel 10 is useful for collecting oil 34 (or other debris) floating in the body of water 30 in a debris field, or oil spill area, 36 at or near the surface 32 of body of water 30. For the purposes of the description below and the appended claims, the "debris field", or "oil spill area", 36 can be characterized as generally having a top layer of floating debris (e.g. oil), followed by a lower layer of debris (e.g. oil) contaminated sea water ("oily water") followed by sea water, particularly when there is turbulence in the water from wind, waves, vessels moving through the oil spill area 36 or other causes. It should be noted, however, that such "layering" is a general description and the actual disposition of oil and other substances and materials in moving sea water 38 is dynamic and thus constantly changing.

In this embodiment, the vessel 10 includes a front or forward end 42, a rear or aft end 44, a left or port side 46, a right or starboard side 48 and is moveable across the surface 32 of the body of water 30 to, from and through the oil spill area 36. The front end 42 of the illustrated vessel 10 is shown having a curved shape, but could instead have a straight, rectangular or any other desired shape.

The vessel 10 may be self-propelled or have any other suitable propulsion arrangement. In this example, the vessel 10 is a ship shape tanker barge 12 moved by a primary mover, such as a tug boat 14, in an integrated tug/barge arrangement. The illustrated tug 14 inserts into the barge 12 at a slot 50 at the rear end 44 of the barge 12. Other embodiments of the vessel 10 may be a self-propelled tanker or other ship, a barge moved by a tanker ship or any other type of waterborne vessel. Furthermore, the vessel 10 may be a retrofit or a new vessel. Thus, the present disclosure is not limited by the nature and type of vessel 10 or how it is propelled in the body of water 30.

Still referring to FIG. 1, in accordance with an embodiment of the present disclosure, the vessel 10 includes a debris recovery system 58 having a plurality of distinct, successively fluidly coupled cargo compartments, or processing/collection tanks, 60. As used herein and in the appended claims, the terms "successive" and variations thereof means one after the other. In the above instance, for example, the cargo compartments 60 are fluidly coupled in succession, or one after the other. So a first compartment is fluidly coupled to a second compartment, which is fluidly coupled to a third compartment and so on. In the present embodiment, the exemplary cargo compartments 60 are positioned proximate or adjacent to one another along at least part of the length 52 of the vessel 10 and below the top deck 54. Each exemplary cargo compartment 60 is arranged and adapted to contain fluid (e.g. sea water 38 and oil 34).

Any desired number of cargo compartments 60 may be included. In this example, a front, or first, cargo compartment 62 is closest to the front end 42 of the vessel 10, a rearmost, or sixth, cargo compartment 64 is closest to the rear end 44 of the vessel 10 and four intermediate cargo compartments 60 (the second 66, third 68, fourth 70 and fifth 72 cargo compartments) are positioned therebetween. However, there may be fewer (e.g. one) or more (e.g. 6, 7, 8, etc.) cargo compartments 60. Some embodiments may include cargo compartments 60 that are side-by-side, one above the other, and/or multiple rows of cargo compartments 60 or any combination thereof. The present disclosure is not limited by the number, size, location and configuration of cargo compartments 60.

The cargo compartments 60 may have any suitable size, shape and dimensions. For example, in some embodiments, the exemplary cargo compartments 60 each have a height of 45 feet, a width of 50 feet and a length of 75 feet.

If desired, the vessel 10 may have additional compartments. For example, the illustrated barge 12 is a double-hull tanker that includes outer compartments surrounding the cargo compartments 60, such as one or more side ballast tanks 80, a forward void 84 (e.g. FIG. 2), a rear void 86 (e.g. FIG. 2) and one or more inner bottom tanks 88 (e.g. FIG. 2). These additional compartments may be used for any suitable purpose. For example, one or more of the ballast tanks 80 may be loaded and/or unloaded during debris recovery operations with sea water to obtain and maintain the desired height of the vessel 10 in the body of water 30. However, the inclusion, quantity, type, configuration, location and use of additional compartments is not limiting upon the present disclosure.

Figure 3:
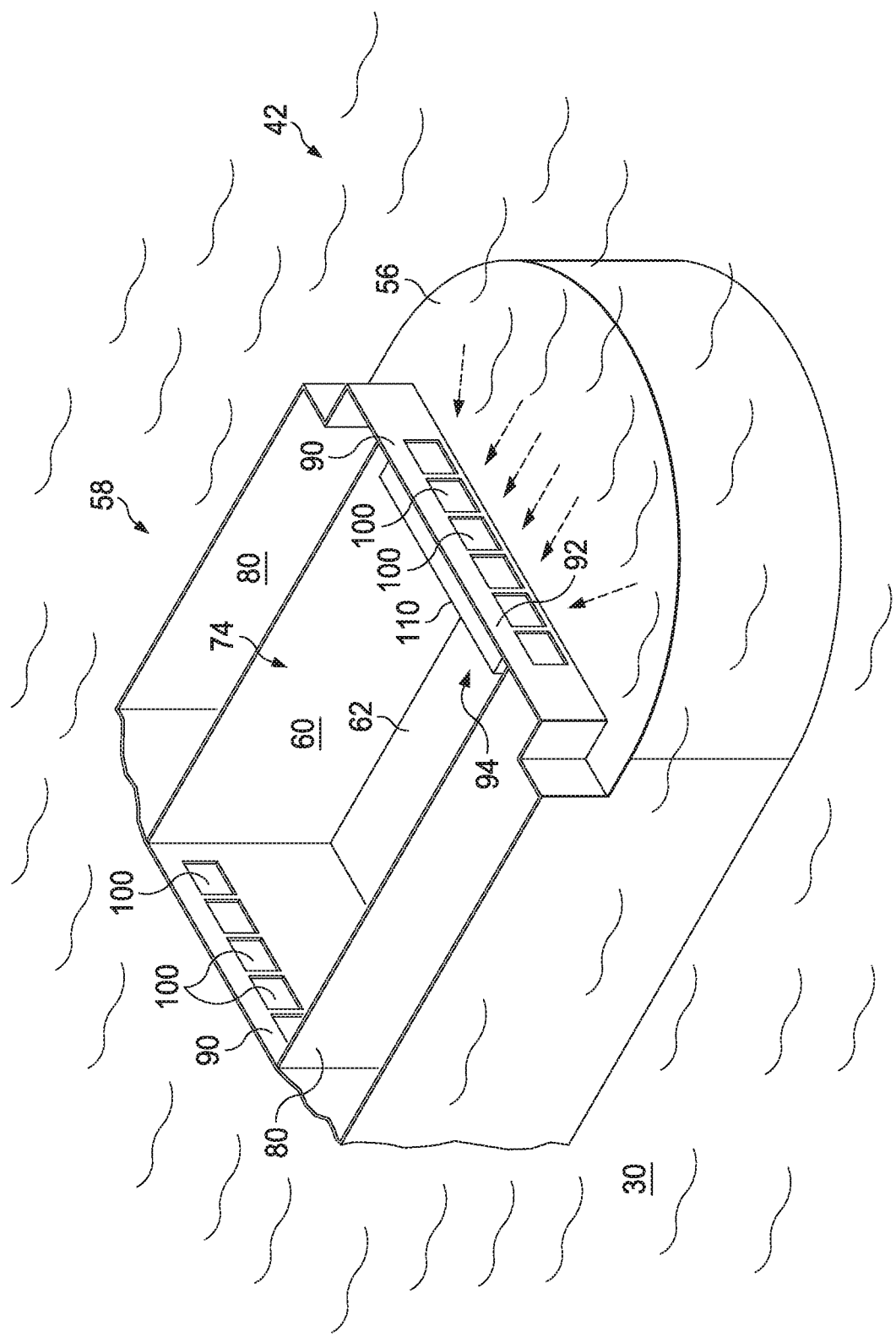
FIG. 3 is a perspective view of part of the front end of the exemplary vessel of FIG. 1.
Figure 4:
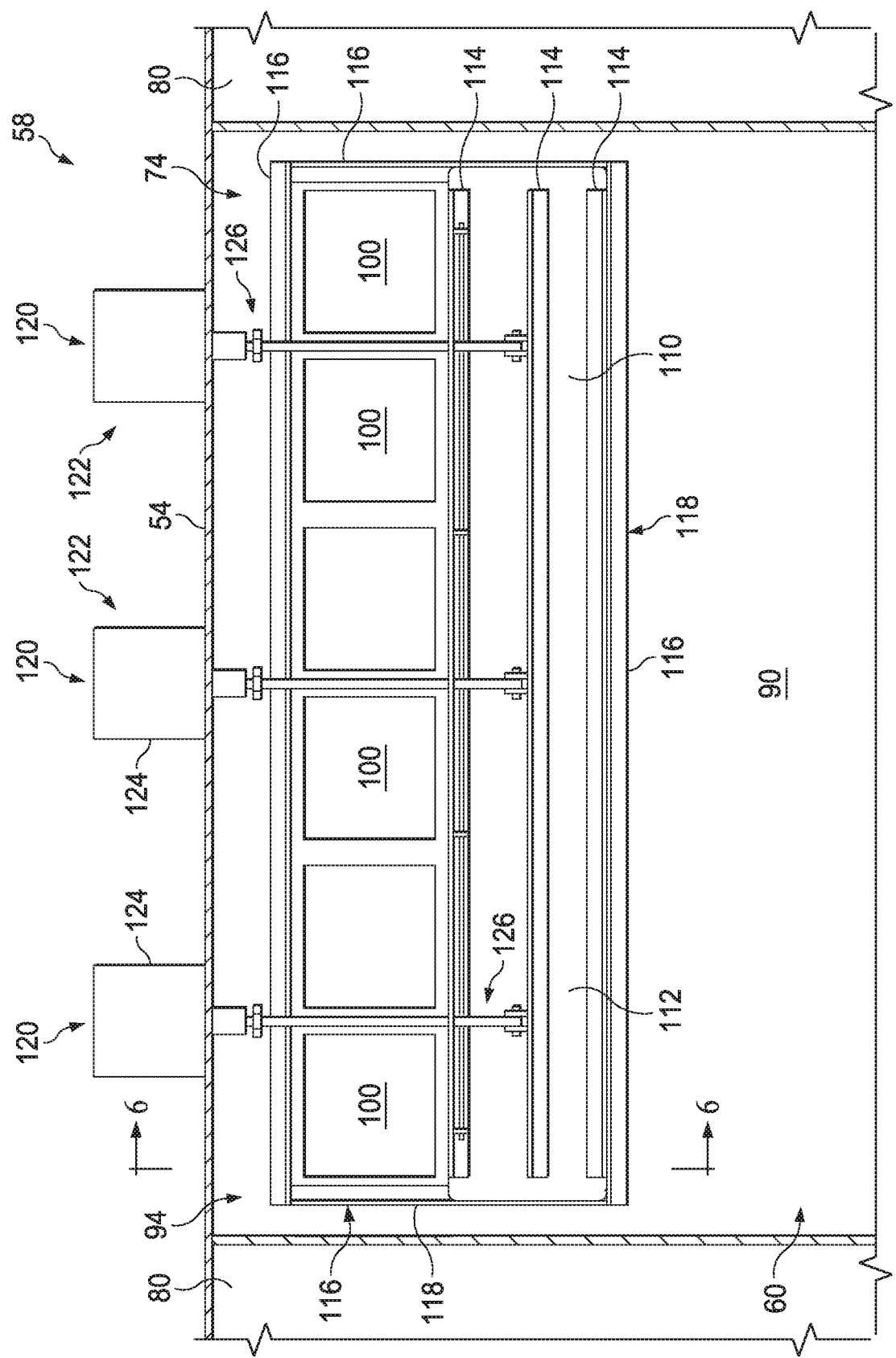
FIG. 4 is a view facing an exemplary vertical wall disposed between cargo compartments of the embodiment of FIG. 1 from inside one of the cargo compartments (facing rearwards) and showing an exemplary associated gate in a fully open position.
Figure 5:
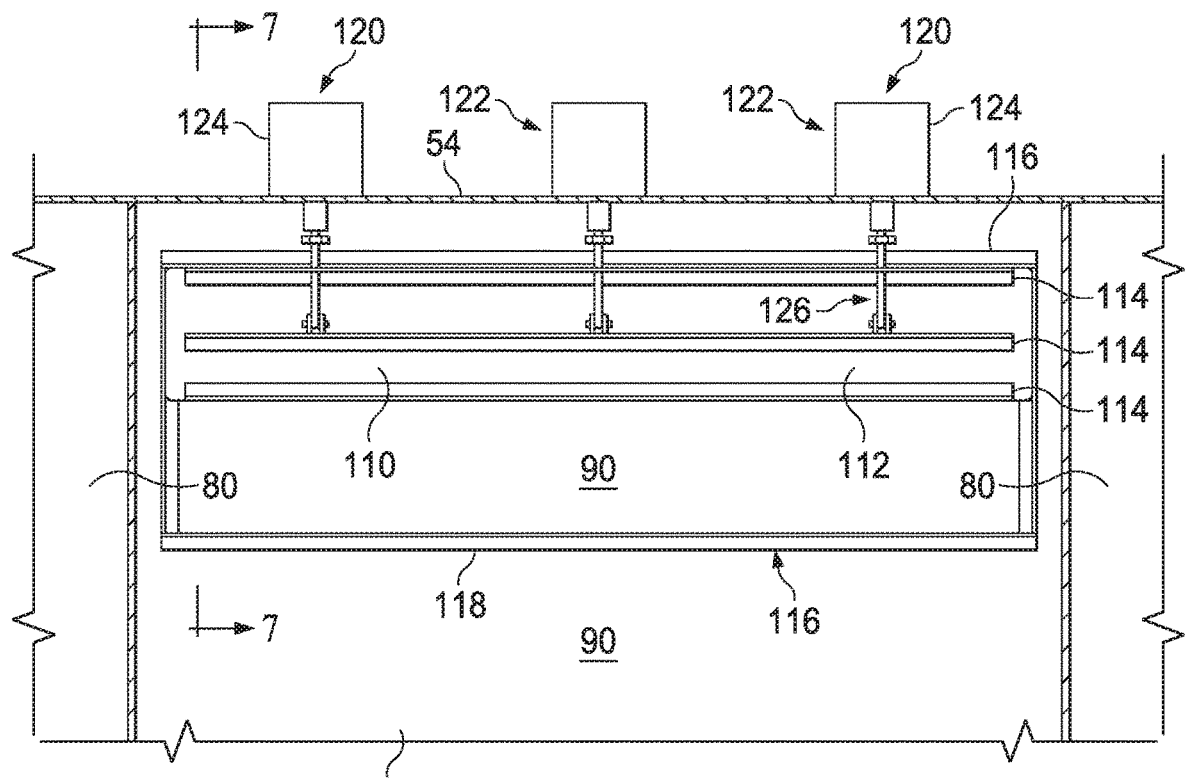
FIG. 5 shows the exemplary vertical wall of FIG. 4 with the exemplary gate in a closed position.

Still referring to the embodiment of FIG. 1, each adjacent pair of illustrated cargo compartments 60 is separated by at least one vertical wall, or bulkhead, 90. At least one vertical wall, or bulkhead, 90 also separates the exemplary front cargo compartment 62 from the front end 42 of the vessel 10 and the body of water 30, and may sometimes be referred to herein as the front vertical wall 92. As used throughout this patent (including the appended claims), the term "vertical" and variations thereof means, includes and refers to perfectly vertical, angled (not perfectly vertical) or otherwise extending in a non-horizontal manner or orientation. For example, the "vertical wall" 90 is not limited to having only a perfectly vertical orientation, but instead means and includes any orientation that is not horizontal. Referring now to FIGS. 3 & 4, each illustrated vertical wall 90 includes at least one fluid passageway, or opening, 100 that allows fluid flow past the associated vertical wall 90. For example, the opening(s) 100 in the front vertical wall 92 (referred to sometimes herein as the intake opening(s) 102 (e.g. FIG. 24)) allows fluid flow between the body of water 30 and the front cargo compartment 62 (see also FIG. 11), while the openings 100 in each successive vertical wall 90 allow fluid flow between the successive adjacent cargo compartments 60 (see also FIG. 12). In other embodiments, the front vertical wall 92 may instead be coupled to one or more forward-facing trunk (not shown) or other component having at least one fluid passageway 100 (e.g. intake opening 102) that allows fluid flow from the body of water 30, through the associated opening(s) 90 and into the front cargo compartment 62. If desired, two trunks (not shown) fluidly coupled to the compartment 62 may be outwardly angled relative to the longitudinal centerline of the vessel 10. Likewise, the fluid passageways 100 in the other vertical walls 90 may communicate fluid through one or more trunks or other components.

In this particular example, each opening 100 is formed in the corresponding vertical wall 90 proximate to its upper end 94 and the upper end 74 of the adjacent cargo compartment(s) 60. As will be described further below, the location of the openings 100 near the upper end 74 of the cargo compartments 60 may be provided, for example, to encourage primarily oil 34 and some oily water (at times, maybe only oil or other debris) to flow into the front cargo compartment 62 from the body of water 30 and then into each successive cargo compartment 66, 68, 70 72 and 64 during debris recovery operations. It should be noted that to the extent that oil and sea water enter any cargo compartment 60, the lower density of the oil 34 and heavier density of the sea water 38 are expected, to a large extent, to cause the oil 34 to ultimately float atop the sea water 38 therein.

The openings 100 may have any suitable size, configuration and orientation. For example, each vertical wall 90 of the illustrated debris recovery system 58 includes six square openings 100, each having dimensions of 6 feet high by 15 feet wide and spaced 6 feet from the top of the associated cargo compartment 60. However, there may be more or less openings 100 formed in each vertical wall 90, which may have any other desired dimensions and location.

Figure 2:
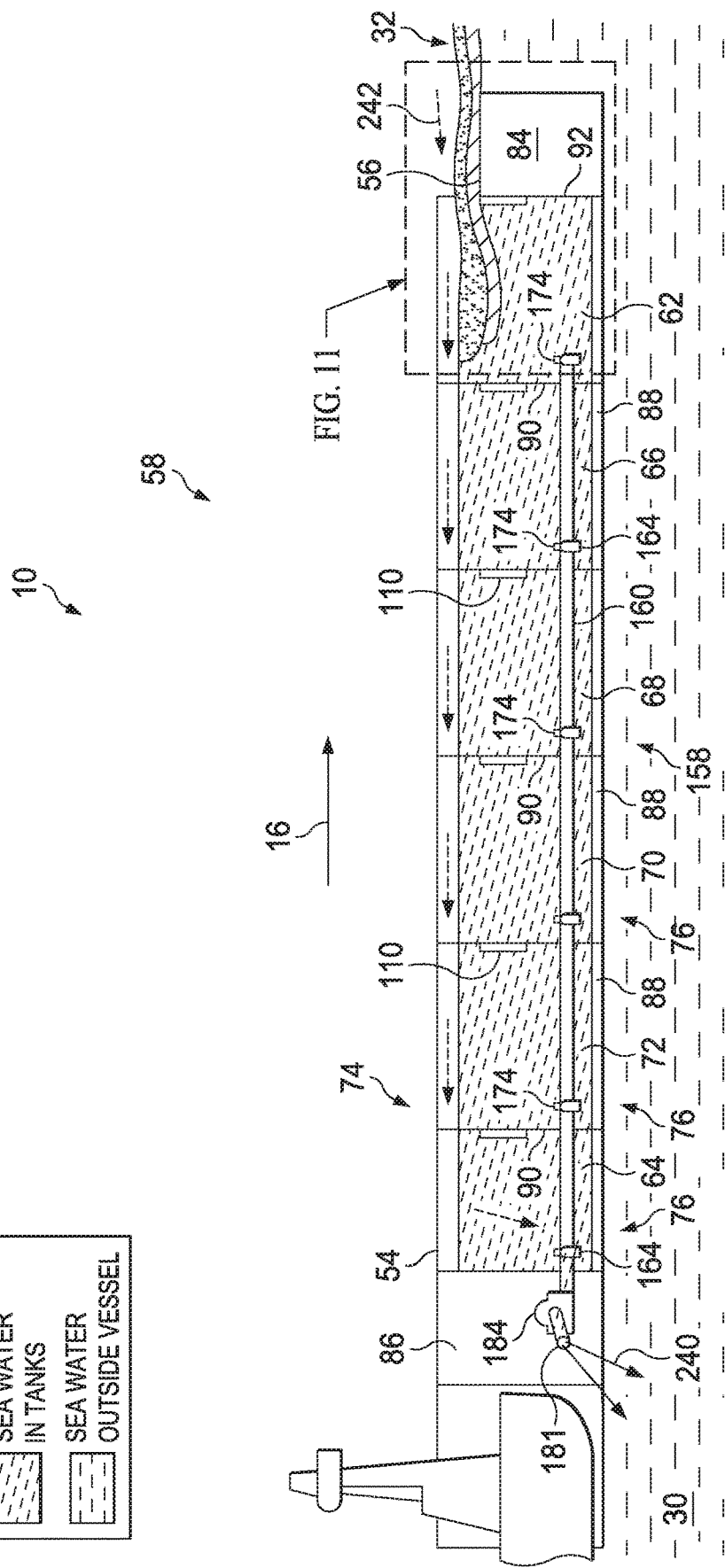
FIG. 2 is a side view of the exemplary vessel of FIG. 1 with the side shell removed to show exemplary interior cargo compartments and other components during exemplary debris recovery operations in accordance with an embodiment of the present disclosure.
Figure 11:
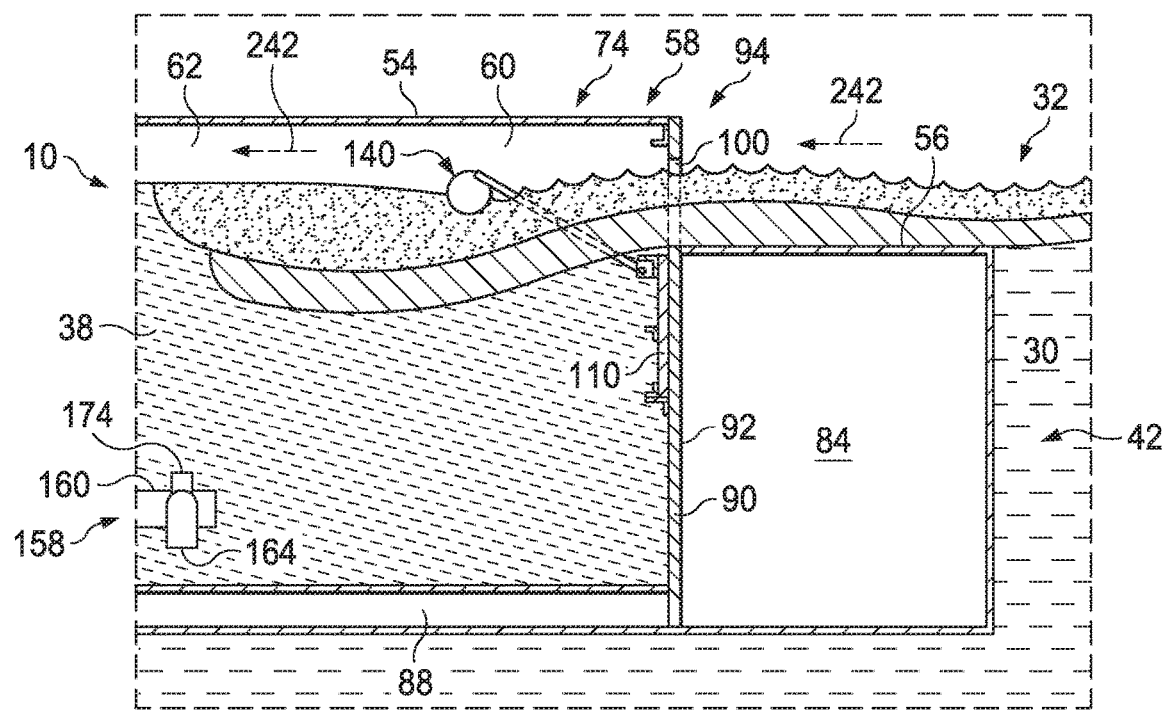
FIG. 11 is an exploded view of part of the exemplary vessel shown in FIG. 2.

Referring to FIGS. 1-3, in the illustrated embodiment, the opening(s) 100 in the front vertical wall 92 allow the flow of liquid into the front cargo compartment 62 from the body of water 30 (see also FIG. 11). The exemplary opening(s) 100 in each successive vertical wall 90 allow liquid to flow at least from the adjacent foremost cargo compartment 60 into the adjacent aft-most cargo compartment 60; or, in other words, into each successive cargo compartment 60 in the aft direction. Thus, in this embodiment, liquid can flow from the body of water 30 into the front cargo compartment 62, then into the second cargo compartment 66, then into the third cargo compartment 68 and so on and finally into the rearmost cargo compartment 64 through the respective openings 100.

Still referring to FIGS. 1-3, if desired, the vessel 10 may have an intake, or recessed front, deck 56 forward of the front vertical wall 92. As used herein, the term "recessed front deck", "intake deck" and variations thereof refers to the uppermost deck of the vessel 10 that is forward of the front vertical wall 92 and is recessed relative to, or lower in height than, the top deck 54 of at least some of the portion(s) of the vessel 10 that extend over the cargo compartments 60. In this embodiment, as shown in FIG. 3, the recessed front deck 56 is a flat plate that aligns below the height of the openings 100 in the front vertical wall 92, such as to assist in encouraging the flow of the top layer(s) of liquid from the body of water 30 into the front cargo compartment 62. However, the recessed front deck 56 may have any other form, configuration and shape or may not be included.

Still referring to FIGS. 1 & 3, the exemplary debris recovery system 58 may include at least one distinct door, or gate, 110 arranged and adapted to allow and disallow the flow of fluid through at least one of the openings 100. Each exemplary gate 110 is selectively movable between at least one open and at least one closed position. In the open position(s), each exemplary gate 110 allows liquid flow through its associated opening(s) 100, and in the closed position(s), each illustrated gate 110 disallows liquid flow through its associated opening(s) 100. If desired, the debris recovery system 58 may be configured so that the gates 110 may be used, at least in part, to further refine the flow of liquid thereby. For example, the position of the respective gates 110 may be remotely adjusted to serve as a skimmer, or oil separator, to encourage mostly oil to waterfall, cascade or pass, by the gate 110 through the associated opening(s) 100. In that context, the gate 110 thus serves as an embodiment of a "sliding"-type wave dampener, or inflow regulator, 140 (as will be discussed below). In the present embodiment, the fully open position(s) of each gate 110 is below the associated opening(s) 100. Consequently, if desired, each exemplary gate 110 may be movable up therefrom, or down from a closed position, into one or more partially open position. Thus, in some embodiments, the height of the gate 110 can be adjusted relative to the lower end of the associated opening(s) 100 to cause a waterfall, or cascading, effect of the top layer(s) of liquid (e.g. oil and oily water) and block the lower, heavier, layer of sea water 38 from passing thereby.

It should be noted that, in some embodiments, the gates 110 in the closed position may not provide a complete fluid-tight seal. Thus, when all gates 110 associated with all the openings 100 in one of the vertical walls 90 are in a closed position, the aft-most adjacent cargo compartment 60 is at least substantially sealed from the inflow of liquid from the other adjacent cargo compartment 60, or, in the case of the front cargo compartment 62, from the body of water 30. For example, when the gate(s) 110 associated with opening(s) 100 in the front vertical wall 92 are closed, the front cargo compartment 62 is at least substantially sealed from the entry of liquid from the body of water 30 through those opening(s) 100. As used herein and throughout this patent and the appended claims, the terms "substantial", "substantially", "primarily" and variations thereof mean generally more than 50% and depending upon the particular components involved and/or circumstances, may be more than 60%, 70%, 80%, 90% and even may be more than 95%. However, in some instances of the use of the terms "generally", "substantially" and variations thereof herein, the above definition may not apply, as should be apparent from the context of such use. For example, in some embodiments, such as upon completion of debris recovery operation and prior to transit of the vessel 10 to an off-loading location, all gates 110 may be 100% sealed.

The gates 110 may have any suitable form, construction, configuration and operation. Referring to FIGS. 4-7, in the illustrated embodiment, a single gate 110 is movable over all the openings 100 formed in the associated vertical wall 90. The exemplary gate 110 includes an elongated plate 112 that is selectively moveable up and down over the adjacent openings 100 between at least one open (e.g. FIGS. 4 & 6) and at least one closed position (e.g. FIGS. 5 & 7) by at least one gate actuator 120. In this embodiment, the gate 110 includes numerous (e.g. three) stiffeners 114 extending at least substantially across the length of the plate 112. The stiffeners 114 may have any suitable form, configuration and construction. For example, the stiffeners 114 may be angle iron coupled to the outside surface of the plate 112, such as to assist in supporting the plate 112 and maintaining the shape of the plate 112 or other desired purpose. However, the present disclosure is not limited to this arrangement. In other embodiments, for example, a distinct gate 110 may be provide for each opening 10, may have a configuration that does not include an elongated plate 112 and/or may not have stiffeners 114.

The gate actuator(s) 120 may have any suitable form, configuration, construction and operation. For example, the gate actuator 120 may be electronically and/or manually and/or remotely controlled. For another example, one or more gate actuators 120 may be used to control movement of one or more gates 110. For yet another example, the gate actuator 120 may be used to selectively move the associated gate(s) 110 between positions, such as between any among multiple different open positions and a closed position, based upon any suitable criteria. For example, any one or more of the gates 110 may be moved to an optimal partially-open position for encouraging mostly oil to flow thereby based upon the particular density, thickness and/or weight of the oil. Thus, the gate actuator(s) 120 may, if desired, be configured so that the position of one or more of the gates 110 may be varied throughout debris recovery operations.

Still referring to FIGS. 4-7, in this embodiment, three gate actuators 120 are used to drive each exemplary gate 110.

Figures 6, 7, 8:
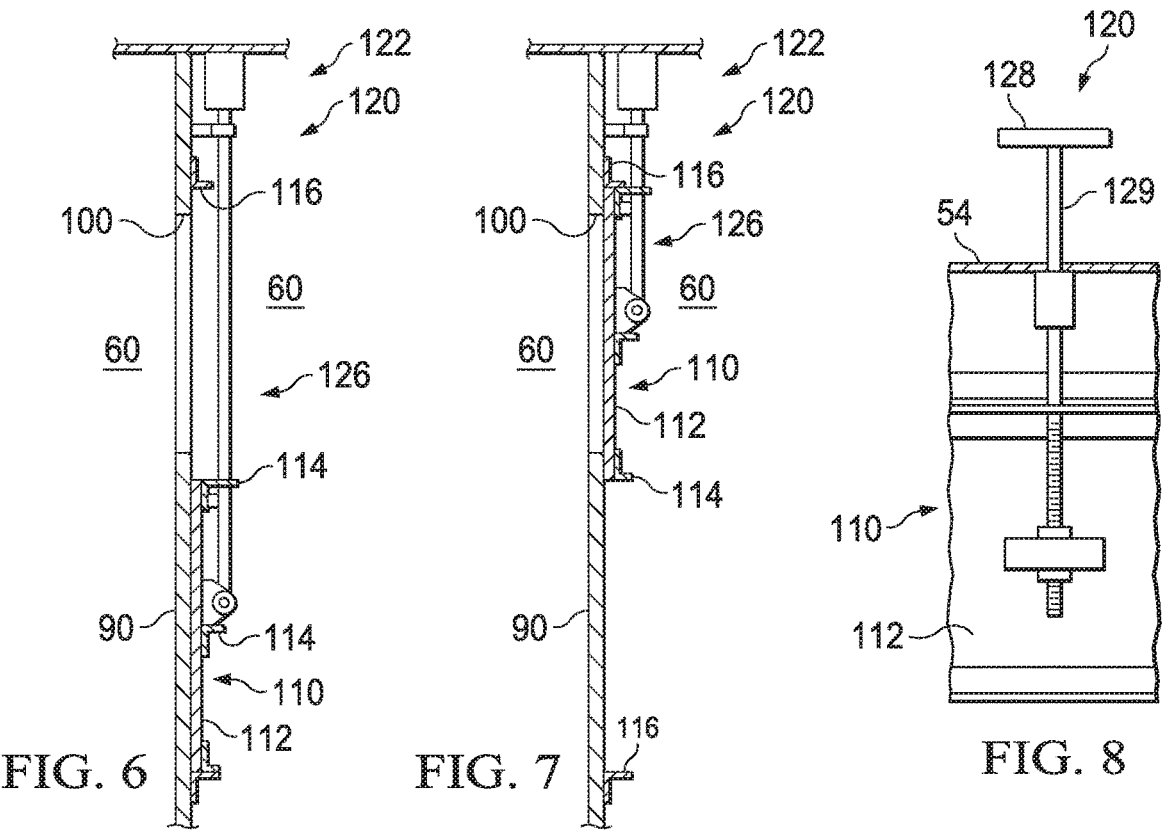
FIG. 6 is a cross-sectional view of part of the exemplary vertical wall and gate of FIG. 4 taken along lines 6-6.
FIG. 7 is a cross-sectional view of part of the exemplary vertical wall and gate of FIG. 5 taken along lines 7-7.
FIG. 8 is a front view of part of an exemplary gate of the present disclosure showing an alternate embodiment of a gate actuator.

Each illustrated gate actuator 120 is a hydraulic actuator 122, as is and become further known. For example, the hydraulic actuator 122 may include a hydraulic power unit 124 (shown positioned above the top deck 54) which drives a telescoping unit 126 coupled to the gate 110. In other embodiments, the gate actuator 120 may be a pneumatic actuator, as is and become further known. In the embodiment of FIG. 8, the gate actuator 120 includes a manually rotatable crank-wheel 128 and crank rod 129 coupled to the gate 110 and configured to move the gate 110 up into at least one closed position and down into one or more open positions. If desired, the crank-wheel 128 may extend above the top deck 54, such as for convenience.

Referring specifically to FIG. 4, if desired, one or more gate guide/sealing mechanisms 116 may be provided, such as to assist in defining one or more position of the gate 110, guiding the up and down movement of the gate 110, enhancing the desired sealing engagement between the gate 110 and vertical wall 90, or any other purpose. The gate guide/sealing mechanism 116 may have any suitable form, configuration, construction and operation. In the illustrated embodiment, the gate guide/sealing mechanism 116 includes a frame 118 extending around the periphery of all of the openings 100 to define the upper and lower limits of movement of the gate 110 and also assist in providing some sealing engagement between the gate 110 in a fully closed position and the vertical wall 90. For example, the frame 118 may be constructed of angle iron coupled to the vertical wall 90.

Now referring to FIGS. 9 & 10, if desired, the debris recovery system 58 may include one or more wave dampeners, or inflow regulators (IFR), 140 within one or more of the cargo compartments 60. As used herein and in the appended claims, the terms "wave dampener", "inflow regulator", "IFR" and variations thereof are used interchangeably. The wave dampener(s) 140 may have any suitable purpose. For example, the wave dampener(s) 140 may be provided to reduce the size of, or turbulence caused by, waves in the liquid passing through one or more of the openings 100, help encourage only the top layers of liquid (e.g. oil, oily water) to pass through the openings 100, and/or help maintain a steady flow of liquid through the openings 100.

The wave dampeners 140 may have any suitable form, configuration, construction and operation. Some embodiments of IFRs 140 are sometimes referred to herein as "sliding"-type IFRs 140 (e.g. gates 110, FIGS. 2, 4-6, 14-18; see also, FIGS. 35-39) because they are designed to move in a generally sliding movement (generally up and down) relative to the vessel 10, while others are sometimes referred to herein as "pivoting"-type IFRs 140 because they are configured to pivot relative to the vessel 10 (see e.g. FIGS. 10-13, 23-29).

Figure 13:
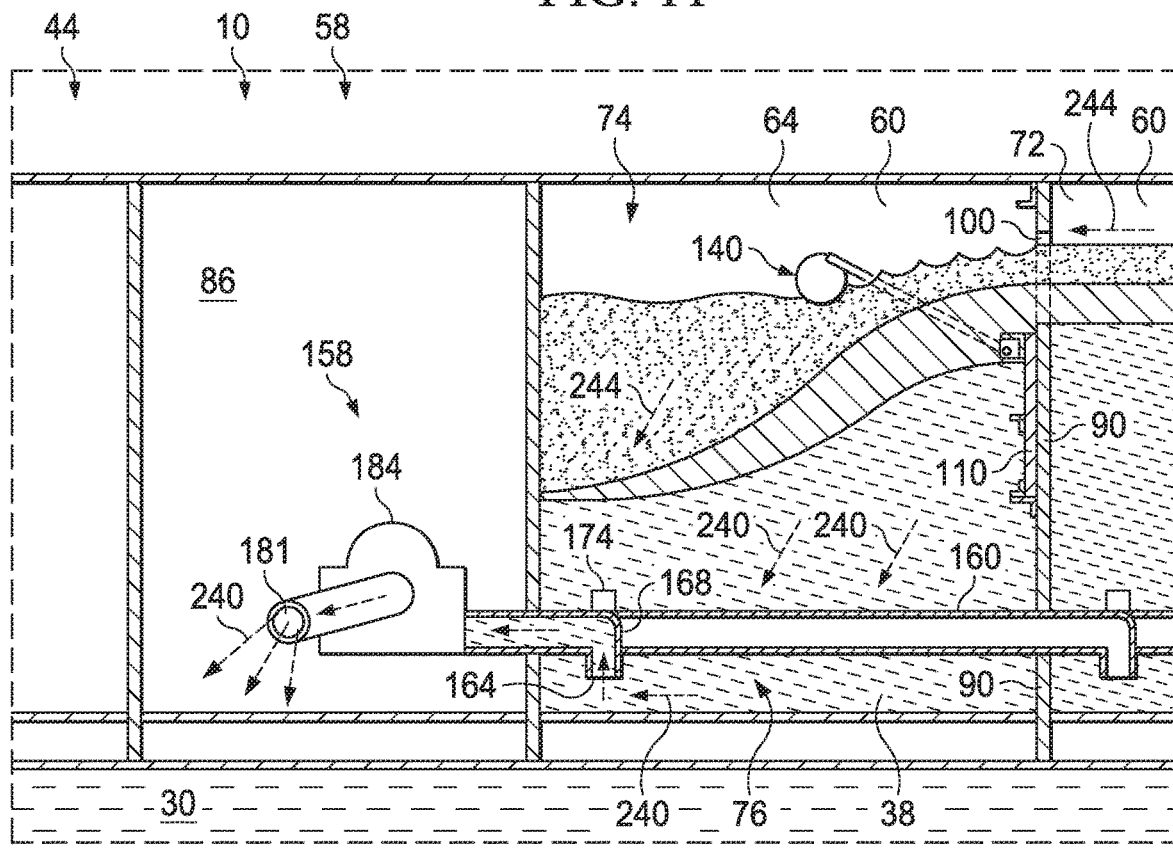
FIG. 13 is an exploded view of part of the exemplary vessel shown in FIG. 12.

Referring again to FIGS. 9 & 10, in this embodiment, a pivoting-type IFR 140 extends into each cargo compartment 60 proximate to the opening(s) 100 formed in the forwardmost vertical wall 90 for that cargo compartment 60 (See also FIGS. 11 & 13). The illustrated wave dampener 140 includes at least one elongated float 144 spaced-away from the vertical wall 90 and arranged to float in the liquid entering the cargo compartment 60 though the openings 100. The exemplary elongated float 144 is configured to freely move up and down with the surface of the liquid. In FIG. 10, for example, the elongated float 144 is shown in three positions as it moves up and down with the incoming liquid.

In this particular embodiment, the elongated float 144 is a single tube 145 (e.g. hollow-pipe) coupled (e.g. by weld, mechanical connectors, etc.) to the end of one or more carrier 146. The illustrated carrier 146 is pivotably connected to the gate 110 associated with the openings 100, such as with one or more hinge pin 148. The exemplary carrier 146 and elongated float 144 extend across all of the openings 100 in the vertical wall 90. Depending upon the particular circumstances and arrangement, the carrier 146 may also assist in reducing the size of, or turbulence caused by, waves in the liquid passing through one or more of the openings 100, encouraging only the top layer(s) of liquid (e.g. oil, oily water) to pass through the openings 100, and/or maintaining a steady flow of liquid through the openings 100. In this embodiment, the exemplary carrier 146 is a flat plate 150. When included, the carrier 146 and float 144 may be constructed of metal, plastic or any other suitable material or combination thereof. In other embodiments, the wave dampener 140 may include multiple elongated floats 144 and/or carriers 146. Further, the wave dampener 140 may instead be coupled to the vertical wall 90 or other component(s).

Referring back to FIGS. 1 & 2, the exemplary debris recovery system 58 may include a fluid removal system 158 configured to allow fluid to be selectively removed from each cargo compartment 60. In other words, fluid can be removed through the fluid removal system 158 from any one or more cargo compartment 60 at the same time, or in isolation relative to the other cargo compartments. Referring specifically to FIGS. 12 & 13, in the present embodiment, the fluid removal system 158 is particularly configured to allow the drainage of sea water 38 from the lower end 76 of any cargo compartment 60 and, at the same time, ultimately allow oil to at least partially fill that cargo compartment 60 from its upper end 74 through the opening(s) 100 in the forward-adjacent vertical wall 90. In fact, the illustrated system 58 allows each successive cargo compartment 60, starting at the rear end 44 of the vessel 10, to be at least substantially drained of sea water 38 and, concurrently, at least partially or substantially filled with oil 34.

The fluid removal system 158 may include any suitable components and operation. In the illustrated embodiment, as shown in FIG. 1, the system 158 includes a main suction conduit 160 extending at least partially through, and fluidly coupled to, each cargo compartment 60 and configured to remove liquid from each cargo compartment 60 as described above. The suction conduit 160 may have any suitable form, configuration, construction, location and operation. The exemplary suction conduit 160 extends lengthwise from the front cargo compartment 62 to aft of the rear cargo compartment 64, and delivers the drained liquid into the body of water 30 proximate to its aft end. However, any other desired configurations may be utilized. For example, the system 158 may include multiple main suctions conduits 160. For another example, the suction conduit(s) 160 may not extend lengthwise through all the cargo compartments 60 and/or may discharge liquid at one or more intermediate location on the vessel 10. For still a further example, the suction conduit(s) 160 may deliver the drained liquid to any other desired destination (e.g. into another one or more compartments and/or other container(s) on the vessel 10, or to another vessel, such as via one or more hose, etc.).

Figure 19:
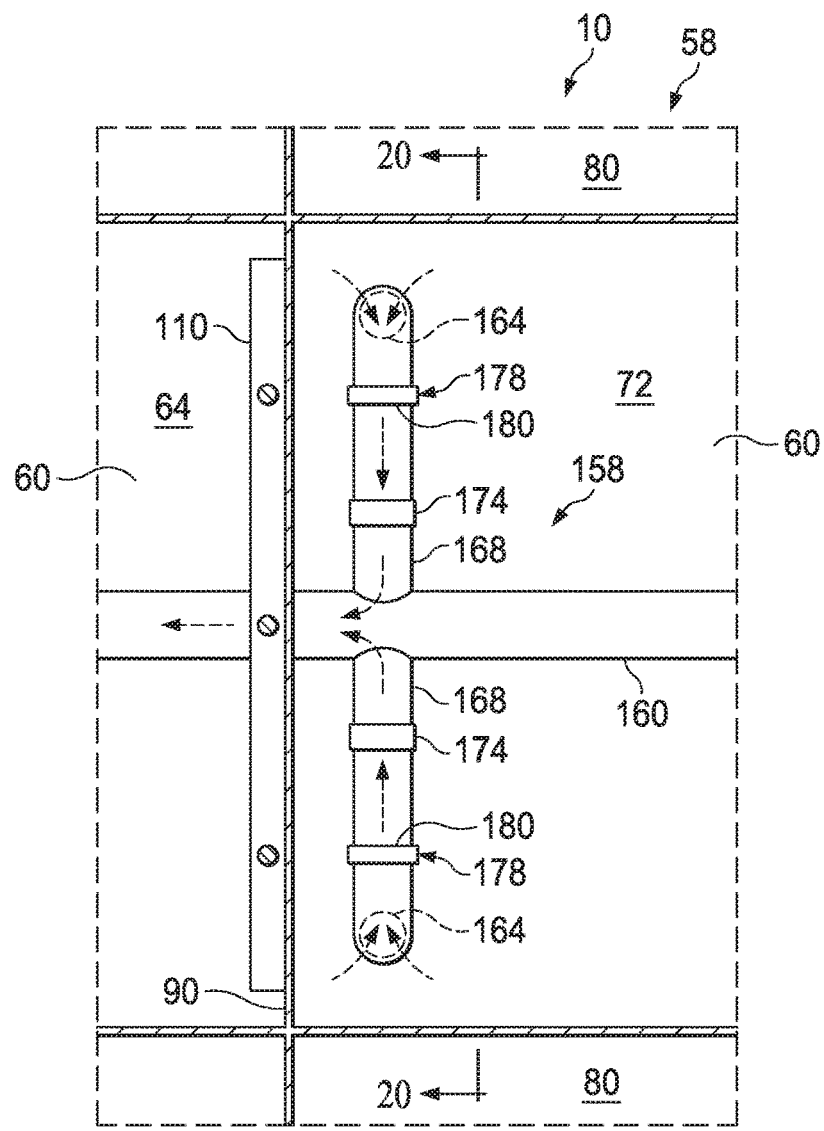
FIG. 19 is an exploded top view of part of the exemplary fluid removal system shown in FIG. 1.
Figure 20:
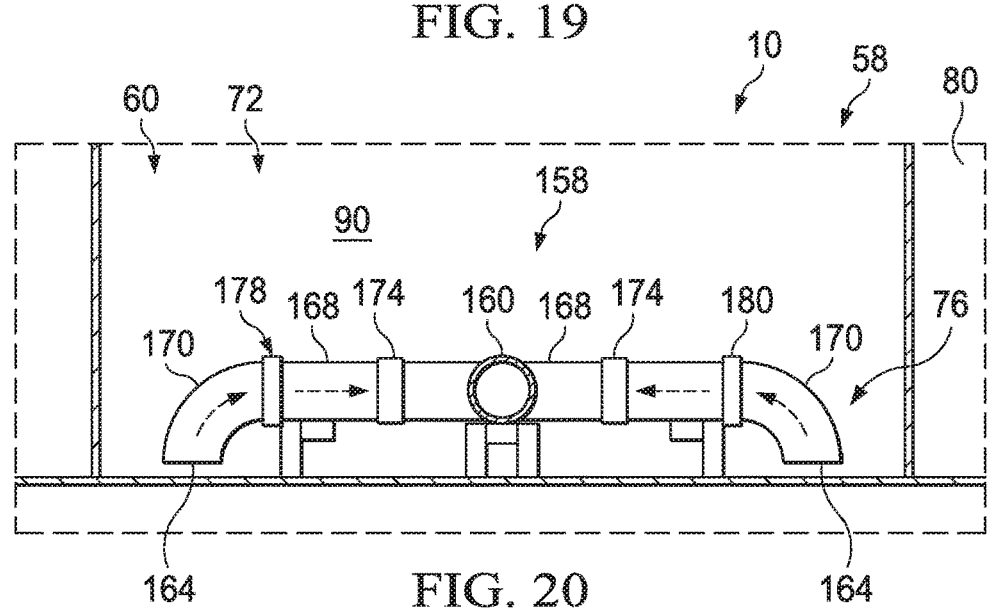
FIG. 20 is a front view of some of the exemplary fluid removal system components in FIG. 19 taken along lines 20-20.

Referring now to FIGS. 19 & 20, the exemplary suction conduit 160 is configured to draw liquid from each cargo compartment 60 at the lower end 76 thereof. For example, the illustrated suction conduit 160 can draw liquid through at least one distinct suction inlet 164 positioned within each respective cargo compartment 60 proximate to the lower end 76 thereof (See also e.g. FIG. 13). In this embodiment, the fluid removal system 158 includes two suction inlets 164 disposed within each cargo compartment 60. The exemplary suction inlets 164 are each provided in a respective inlet pipe section 168 fluidly coupled to and extending laterally from the suction conduit 160. The illustrated suction inlets 164 are positioned to optimally draw in liquid (e.g. sea water) from the bottom of the cargo compartment 60. For example, the inlets 164 may be positioned as close to the bottom (lower end 76) of the associated cargo compartment 60 as is possible or practical. In this embodiment, each suction inlet 164 is the open end of a downwardly facing elbow pipe 170 provided at the ends of the respective inlet pipe sections 168. However, this exemplary configuration is not limiting upon the present disclosure. Any other suitable arrangement may be used to remove fluid (e.g. sea water) from one or more cargo compartments 60.

The size, number and location of the suction inlets 164 may be determined based on any suitable criteria, such as to provide the desired liquid flow rate in the associated cargo compartment 60. For example, the velocity of the liquid (e.g. sea water) being removed from the cargo compartments 60 may be determined or limited to control or limit the turbulence and mixing of the liquid (e.g. oil, oily water) entering the successive compartments 60 through the associated openings 100 and promote the separation of oil and sea water in the cargo compartments 60.

Still referring to FIGS. 19 & 20, the fluid removal system 158 may be configured to fluidly isolate each cargo compartment 60 in any suitable manner. For example, at least one fluid valve 174 may be associated with each cargo compartment 60. In the present embodiment, in an open position, each such valve 174 will allow the flow of liquid from the associated cargo compartment 60 into the suction conduit(s) 160 at the location of that valve 174. In a closed position, each exemplary valve 174 will disallow liquid flow between the associated cargo compartment 60 and the suction conduit 160 at the location of that valve 174. Any suitable arrangement of valves 174 may be used for selectively allowing and disallowing liquid flow from each cargo compartment 60 into the fluid removal system 158. In this embodiment, a distinct selectively controllable valve 174 is provided between the suction conduit 160 and each suction inlet 164, such as in each inlet pipe section 168. Thus, to remove liquid from a particular cargo compartment 60, the exemplary valves 174 in that cargo compartment 60 are opened and the valves 174 in all other cargo compartments 60 are closed. In some embodiments, it may be possible to open one or more valves 174 in multiple cargo compartments 60 at the same time.

The valve(s) 174 may have any suitable form, configuration and operation. For example, the valves 174 may be the presently commercially available Class 123, iron body, gate-type valves having an outside screw and yoke with a rising stem by Crane Co. If desired, the valves 174 may be remotely actuated, such as via an electronic controller or computer-based control system, as is and becomes further known.

Still referring to FIGS. 19 & 20, if desired, the fluid removal system 158 may include one or more debris sensor 178 to determine when the debris being recovered from the body of water 30 is approaching or entering the fluid removal system 158. For example, the debris sensor(s) 178 may be mounted in the cargo compartment 60 or coupled to the fluid removal system 158. The debris sensor 178 may have any suitable form, configuration and operation. In this embodiment, the debris sensor 178 is an oily water sensor 180 disposed within each cargo compartment 60 proximate to each suction inlet 164 and configured to detect oil in the liquid entering the associated section inlet 164. For example, a distinct oily water sensor 180 may be fluidly coupled to each inlet pipe section 168 or the suction conduit 160. The illustrated oily water sensor 180 may, for example, be the presently commercially available Model EX-100P2/1000P2, in-line analyzer by Advanced Sensors. For another example, at least one oily water sensor may be mounted elsewhere in the cargo compartment 60. An example of a presently commercially available oily water sensor 180 that may be mounted elsewhere in the cargo compartment 60 is the Model EX-100M/1000M side stream analyzer by Advanced Sensors. If desired, the system 58 may be configured so that each sensor 178 may communicate with an electronic controller or computer-based control system, such as to provide control signals to the sensor 178 and/or for the sensor 178 to provide signals when the debris (e.g. oil) is detected in the sea water entering the associated suction inlet 164.

Referring back to FIG. 1, the fluid removal system 158 may deliver the fluid removed from the cargo compartments 60 to one or more desired destination in any suitable manner. In this embodiment, the suction conduit 160 discharges liquid from the cargo compartments 60 into the body of water 30 via at least one discharge opening 181 disposed aft of the rear cargo compartment 64. For example, the discharge opening 181 may be disposed on one or the other side 46, 48 of the vessel 10 and fluidly communicate with the suction conduit 160 via one or more discharge pipe sections 182. In the illustrated embodiment, at least one discharge pipe section 182 extends laterally from each side of the suction conduit 160 toward a distinct discharge opening 181 on the left or right side 46, 48 of the vessel 10, respectively.

If desired, the fluid removal system 158 may include one or more discharge pumps 184 configured to assist in drawing fluid (e.g. sea water) from one or more cargo compartments 60 into the suction conduit 160 and discharge it from the debris recovery system 58. For example, the discharge pump(s) 184 may provide "active" removal of fluid from the cargo compartments 60, such as to expedite the debris recovery operation, eliminate the need to continuously move the vessel 10 through the debris field 36 during debris recovery operations or other purpose.

The discharge pump 184 may have any suitable form, configuration, location, operation and purpose. In this embodiment, a distinct discharge pump 184 is fluidly coupled to the discharge pipe section(s) 182 on each side of the suction conduit 160 and configured to create suction in the system 158 to draw liquid from one or more cargo compartments 60, through the suction conduit 160 and out the associated discharge opening 181. In other embodiments, one or more banks of multiple discharge pumps 184 (e.g. 2 banks of 5 or 6 pumps each) may be provided, such as to enhance the ability to control fluid removal during debris recovery operations, provide greater flexibility in fluid removal, reduce the potential for negative consequences caused by pump failure during operations, one or more other purposes, or a combination thereof. The illustrated discharge pump 184 may be any suitable pump capable of providing sufficient suction on one of its sides to draw liquid from one or more cargo compartments 60 into the suction conduit 160 and discharge the fluid through the associated discharge opening(s) 181. For example, the discharge pump 184 may be a presently commercially available Model 3498 double suction pump by Goulds Pumps. However, some embodiments may not include any discharge pumps 184.

Still referring to FIG. 1, if desired, the fluid removal system 158 may include one or more fluid valves 188 to seal off the suction conduit 160 and/or or other components of the system 158. The valve(s) 188 may have any suitable form, configuration, location and operation and purpose. In the present embodiment, one or more valves 188 are provided proximate to each discharge opening 181 to seal off the aft end of the suction conduit 160 and related components from the body of water 30 when the system 158 is not in operation, during transit and/or after the cargo compartments 60 have been at least partially filled with oil and oily water. For example, a valve 188 is shown fluidly coupled to the discharge pipe section 182 between each discharge opening 181 and adjacent discharge pump 184. Any suitable type of fluid valve 188 may be used, such as the presently commercially available Class 123, iron body, gate-type valves having an outside screw and yoke with a rising stem by Crane Co. If desired, the valves 188 may be remotely actuated, such as via an electronic controller or computer-based control system, as is and becomes further known.

Still referring to the embodiment of FIG. 1, the debris recovery system 58 may include at least one at least partially floating, elongated, boom 190 disposed proximate to the front end 42 of the vessel 10. In some embodiments, the boom(s) 190 may be useful, for example, to encourage liquid to flow into the front cargo compartment 62 from the body of water 30 and, in particular, to ultimately effectively funnel, or corral, the top layer(s) of liquid, namely oil and oily water, for entry into the cargo compartment 62. Any desired number, type, configuration and construction of booms 190 may be included, and the boom(s) 190 may have any suitable location and operation. In the illustrated embodiment, the debris recovery system 58 includes first and second elongated booms 192, 194 configured to be movable between at least one stowed position and at least one deployed position. In the stowed position, the exemplary booms 192, 194 are positioned adjacent to the front end 42 of the vessel 10, such as shown in shadow in FIG. 1. In other embodiments, the boom(s) 190 in the stowed position may be positioned at least partially on the front end 42 of the vessel 10, such as atop the recessed front deck 56.

In at least one deployed position, the exemplary booms 190 extend angularly outwardly from the vessel 10 away from the front end 42, the first elongated boom 192 being closer to the left side 46 of the vessel 10 and the second elongated boom 194 being closer to the right side 48 of the vessel 10. In some embodiments, for example, the booms 192, 194 may extend out into the body of water at an approximate 45 degree angle relative to the longitudinal centerline of the vessel 10. In this embodiment, the deployed positions of the booms 190 are useful to form an overall funnel shape forward of the vessel 10 to allow or encourage liquid, particularly oil, to flow or funnel into the front cargo compartment 62 during debris recovery operations. If desired, one or more cables or other connectors may be coupled between each boom 190 and the vessel 10, such as to provide support for the boom 190 in the deployed position(s), maintain the position of the boom 190 in the deployed position, prevent the boom 190 from moving back towards the vessel 10 from the deployed position or other suitable purpose. For example, multiple cables or other connectors may extend between the vessel 10 and each boom 190 at different locations along the length of the boom 190.

Figure 21:
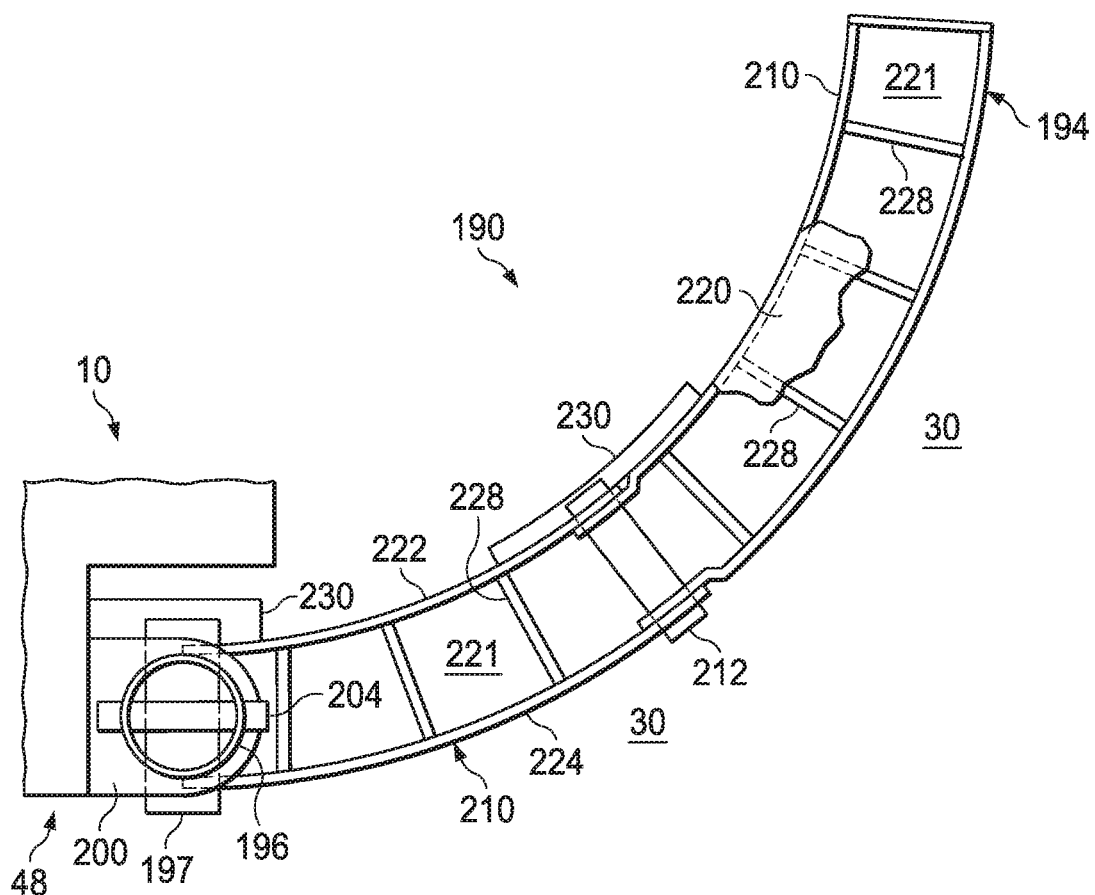
FIG. 21 is a top view of an exemplary elongated boom of FIG. 1 shown in a stowed position.
Figure 22:
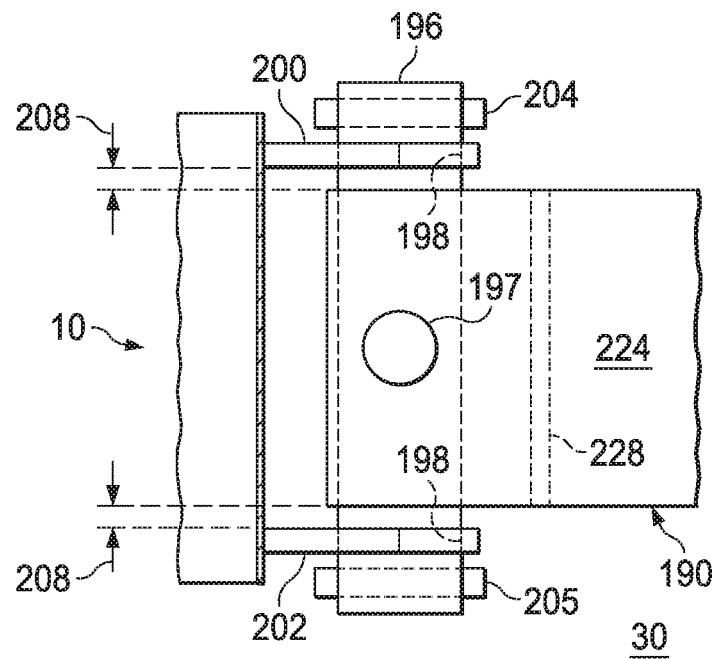
FIG. 22 is an exploded view of part of the exemplary elongated boom of FIG. 21.

The elongated boom(s) 190 may be movable between at least one stowed and at least one deployed position in any suitable manner. Referring to FIGS. 21 & 22, in this embodiment, each boom 190 is pivotably engaged with the vessel 10. For example, the boom 190 may be secured to a vertical pipe, or pin, 196, such as with one or more cross pin 197 extending transversely through the boom 190 and vertical pipe 196. The illustrated cross pin 197 allows the concurrent movement of the boom 190 and vertical pin 196. The exemplary vertical pin 196 is rotatable within holes 198 formed in at least one upper bracket 200 and at least one lower bracket 202 extending from, or coupled to, the vessel 10. The vertical pin 196 may be prevented from sliding out of the holes 198 in any suitable manner, such as with upper and lower locking pins 204, 206 extending transversely through the vertical pin 196 above and below the upper and lower brackets 200, 202, respectively. However, the present disclosure is not limited to this arrangement for moving the elongated boom(s) 190 between at least one stowed and at least one deployed position. For example, in some embodiments, one or more hydraulic or pneumatic actuators, cables, winches or other known components may be used to move booms 190 between stowed and deployed positions.

If desired, the boom 190 may be configured to be moveable into and secured in more than one distinct deployed position. This may be desirable, for example, to form a wider or narrow outer reach of multiple booms 190, or any other purpose. Any suitable mechanism(s) may be used to provide multiple distinct deployed positions of the boom(s) 190. For example, the vertical pin 196 may be engaged with a ratchet-like mechanism to secure the boom 190 in multiple deployed positions. If desired, the movement of the boom(s) 190 between at least one stowed and at least one deployed position may be automated and/or automatically controlled, such as with an electronic controller or computer-based control system, as is and becomes further known.

Still referring to FIGS. 21 & 22, each exemplary elongated boom 190 may be movable vertically relative to the vessel 10 during operations and/or include multiple articulating boom sections 210 to allow the boom 190 to follow or respond to the action of waves in body of water 30, reduce the potentially damaging forces places upon the boom 190 and/or connecting components (e.g. vertical pin 196, locking pins 204, 206, brackets 200, 202) during extreme or near extreme sea conditions, maintain a desired position of the boom 190 in the body of water 30 or any other suitable purpose. These features may be useful, for example, to enhance the flexibility and capabilities of the vessel 10 and debris recovery system 58 to operate in typical deep sea conditions and not have to wait for the debris field to move close to shore.

Each boom 190 may be vertically moveable relative to the vessel 10 in any suitable manner. For example, the vertical pin 196 may be movable up and down relative to the upper and lower brackets 200, 202 within a desired range of motion. In this embodiment, the vertical pin 196 is movable up and down relative to the upper and lower brackets 200, 202 a desired distance 208. For example, if the distance 208 is 3 feet, the boom 190 and connected vertical pin 196 may move up to three 3 feet up and down relative to the brackets 200, 202 and vessel 10.

Still referring to FIGS. 21 & 22, each exemplary boom 190 includes multiple, interconnected, articulating boom sections 210 that are moveable relative to one another during debris recovery operations. While the illustrated embodiment includes two articulating boom sections 210, other embodiments may include three, four, five, size or more boom sections 210. The boom sections 210 being moveable relative to one another in any suitable manner. For example, the illustrated boom sections 210 are pivotably coupled together to allow each of them to move up and down relative to one other when the boom 190 is in one or more deployed positions. In this embodiment, adjacent boom sections 110 are connected with at least one hinge pin 212 extending transversely between them and allowing their relative up and down movement. In other embodiments, the boom sections 210 may be also or instead moveable side to side relative to one another.

Still referring to the embodiment of FIGS. 21 & 22, each elongated boom 190 may have an overall curved, straight or varied-shaped outer profile. The exemplary boom 190 is formed in a hollow box-beam configuration with one or more top plate 220, bottom plate 221, inner side plate 222, outer side plate 224 and end cap plate 226. If desired, one or more stiffener plates 228 may be provided within the boom 190, such as to add stiffness and structural support to the boom 190. The exemplary stiffener plates 228 are shown extending between the side plates 222, 224, but could also or instead be provided between the top and bottom plates 221 or oriented in a different configuration. The exemplary plates 220, 221, 222 and 224 and stiffener plates 228 are constructed of any suitable material, such as steel. However, the boom 190 may have any other suitable construction.

If desired, one or more flexible, fluidly impermeable cover 230 may be coupled to the boom 190 over the cross pin 197 and/or hinge pin(s) 212. This may be useful in some embodiments, for example, to prevent liquid, and particularly oil, from escaping from inside the funnel area caused by the boom(s) 190 through the boom 190 at the location of the cross pin 197 and hinge pin(s) 212. The flexible cover 230 may have any suitable form, configuration, construction and operation. For example, the flexible covers 230 may be flaps, sheets or other arrangements of heavy, flexible neoprene rubber. In this embodiment, each flexible cover 230 is coupled to the boom 190 only on one side of the respective cross pin 197 or hinge pin 212 to allow the remainder of the cover 230 to slide relative to the boom 190 during shifting or movement of the boom 190 or articulating section(s) 210 during operations. For example, the cover 230 disposed over the cross pin 197 may be coupled to the boom 190 forward of the cross pin 197, and the cover 230 disposed over each hinge pin 212 may be coupled to the adjacent boom section 210 forward of the hinge pin 212. In other embodiments, the cover 230 may instead be coupled to the boom 190 or other component on both respective sides of the cross pin 197 and/or hinge pins 212. For example, the cover 230 may have a pleated, or accordion-like, configuration and be coupled to both sides of the boom 190 or boom sections 210 so that it gives, or bends along with the boom 190 and/or boom sections 210.

Referring back to FIGS. 1 & 3, in some embodiments, the vessel 10 may be arranged and ballasted so that its front end 42 and the boom(s) 190 are at least partially submerged in sea water during debris recovery operations. In some circumstances, this may be beneficial to provide the desired rate and/or flow of liquid into the cargo compartments 60, encourage the top layer of liquid (e.g. oil) to enter the cargo compartments 60 from the body of water 30 or other desired purpose. In the present embodiment, the vessel 10 may be configured so that when the vessel 10 is submerged to its load line, the recessed front deck 56 is at least partially submerged and the booms 192, 194 and openings 100 in the front vertical wall 92 are partially submerged so that the top layer(s) on the surface 32 of the body of water 30 can wash across the recessed front deck 56 and flow directly into those openings 100. For example, the vessel 10 may be arranged and ballasted so that the booms 190 and the openings 100 in the front vertical wall 92 are submerged up to approximately ½ their respective heights. Thus, if the booms 190 and the openings 100 in the front vertical wall 92 each have a height of 6 feet, for example, the vessel 10 may be positioned in the body of water so the boom 190 and openings 100 are each submerged 3 feet. However, any other desired arrangement may be used.

An exemplary method of removing debris from a body of water 30 in accordance with an embodiment of the present disclosure will now be described. Referring initially to the embodiment of FIGS. 1 & 2, the cargo compartments 60 of the debris recovery vessel 10 are initially at least substantially filled with water in any suitable manner. If desired, the cargo compartments 60 may be flooded with sea water 38 before the vessel reaches the oil spill area 36. For example, all the gates 110 could be moved into a fully open position to allow the cargo compartments 60 to free flood with sea water 38. Also if desired, the free flooding of the cargo compartments 60 could be performed during the forward movement of the vessel 10 in the direction of arrow 16 (FIG. 2), such as to flood, or assist in expediting flooding of, the compartments 60. Preferably, the illustrated valves 174 are closed during free flooding of the cargo compartments 60. However, it may be possible to temporarily open the valves 174 and even turn on one or more discharge pump 184 to fill the compartments 60 with sea water. The vessel 10 may be arranged and ballasted so that flooding the cargo compartments 60 will submerge the vessel 10 to the desired load line, such as described above.

After the exemplary cargo compartments 60 are at least substantially filled with water, the vessel 10 is moved to the oil spill area 36. Preferably at that time, each illustrated boom 190 is moved to a deployed position, such as described above. However, the boom(s) 190 may be moved into a deployed position at an earlier or later time. Once at the oil spill area 36, while all of the exemplary gates 110 are in an open position, sea water is removed from the rear cargo compartment 64. For example, one or more of the valves 188 are opened and all of the valves 174, except those in the rear cargo compartment 64, are closed. The exemplary valves 174 in the rear cargo compartment 64 are opened to remove sea water from the lower end 76 of the rear cargo compartment 64 into the suction conduit 160 and out one or more discharge opening 181 in the path of arrows 240 (FIG. 2). If desired, one or more discharge pump 184 may be turned on, such as to provide active suction and pumping of the sea water.

Still referring to the embodiment of FIG. 2, as sea water is removed from the lower end 76 of the rear cargo compartment 64, liquid is simultaneously drawn into or enters the front cargo compartment 62 through the openings 100 in the front vertical wall 92. Although it is impossible to forecast the actual makeup of the liquid entering those openings 100 at any specific point in time, the exemplary debris recovery system 58 is configured so that primarily the liquid on and near the surface 32 of the body of water 30 (e.g. oil and some oily water) enter the front cargo compartment 62, as shown by flow arrow 242 in FIGS. 2 & 11.

In accordance with this embodiment, since the intermediate cargo compartments 66, 68, 70 and 72 are substantially full of sea water, as the lower end 76 of the rear cargo compartment 64 is being emptied of sea water, the upper layers of liquid (e.g. oil and some oily water) entering the front cargo compartment 62 are preferably drawn across the surface of the sea water in the intermediate cargo compartments 66, 68, 70 and 72 through the openings 100 in each successive vertical wall 90 and ultimately into the rear cargo compartment 64, such as shown with flow arrows 244 in FIG. 12. If one or more exemplary wave dampeners 140 (e.g. FIGS. 11 & 13) are included in one or more of the cargo compartments 60, the wave dampener(s) 140 may assist in encouraging primarily oil and some oily water to enter the front and subsequent cargo compartments 62, 66, 68, 72 and 64 through the successive openings 100, reduce wave action and turbulence of liquid entering each compartment 60, help maintain a steady flow of liquid through the openings 100 or other desired purpose. In this embodiment, as sea water continues to be drawn down through the rear cargo compartment 64, it is expected that at least some of the oil in the oily water therein will separate and float on top of the sea water, further separating the oil from the sea water therein.

Referring now to the embodiment of FIGS. 12 & 14, when substantially all of the sea water in the exemplary rear cargo compartment 64 is removed, that compartment 64 is fluidly isolated as desired. For example, the compartment 64 may be fluidly isolated from the fluid removal system 158 and the other compartments 60, such as by closing the valves 174 in the cargo compartment 64 and the gate(s) 110 associated with the openings 100 that lead into that compartment 64. In some embodiments, the cargo compartment 64 may be fluidly isolated when it is substantially full of oil. For example, this may occur when one or more debris sensors 178, such as the oily water sensors 180 (e.g. FIG. 20), indicate the presence of some or a particular amount of oil in the exiting sea water.

In this embodiment, to continue the debris recovery operations, the above process as performed with respect to the rear cargo compartment 64 is repeated for each successive aft-most cargo compartment 60. For example, referring to FIG. 14, the valve(s) 174 in the next cargo compartment 72 are opened to allow sea water to be removed from the lower end 76 of that compartment 72 in the path of arrows 240. Substantially simultaneously, principally oil and some oily water preferably enters into the upper end 74 of, and fills, that cargo compartment 72, such as shown with flow arrows 244. In this embodiment, when substantially all sea water in that cargo compartment 72 is removed (e.g. FIG. 15), that compartment 72 is fluidly isolated. For example, the compartment 72 may be fluidly isolated at least from the remaining forward cargo compartments 60 which still contain sea water, or fluidly isolated similarly as described above with respect to cargo compartment 64. For example, the valves 174 in that cargo compartment 72 and the gate(s) 110 associated with the openings 100 that lead into that compartment 72 may be closed.

Figure 15:
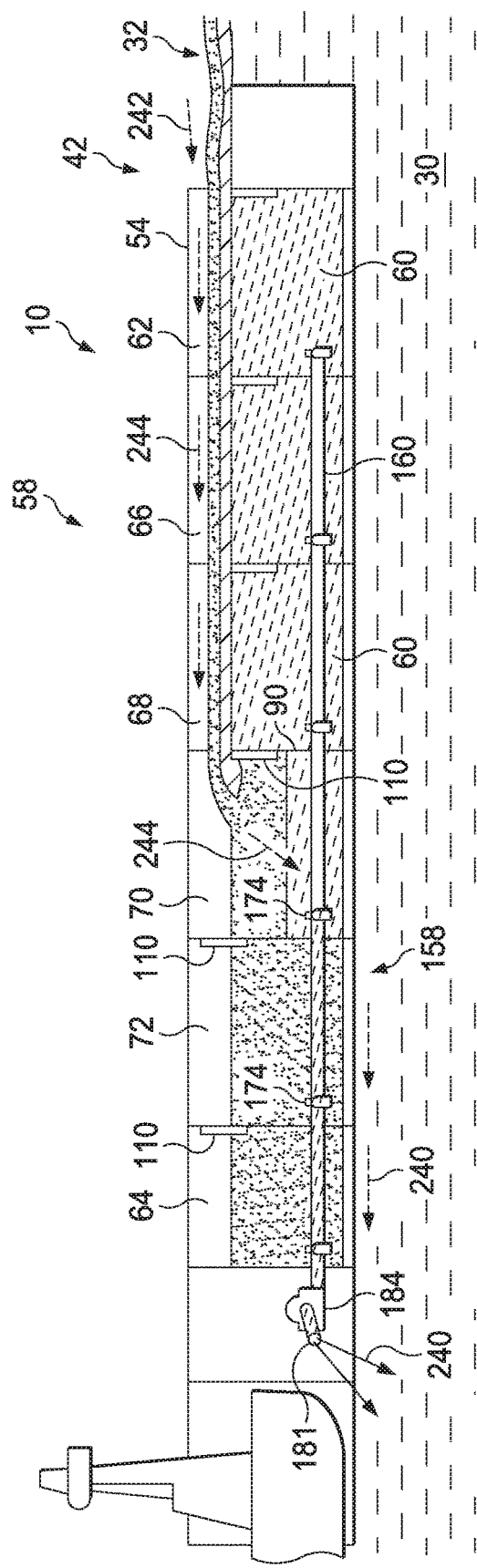
FIG. 15 is a side view of the exemplary vessel of FIG. 1 with the side shell removed to show exemplary interior cargo compartments and other components during exemplary debris recovery operations in accordance with an embodiment of the present disclosure.
Figure 16:
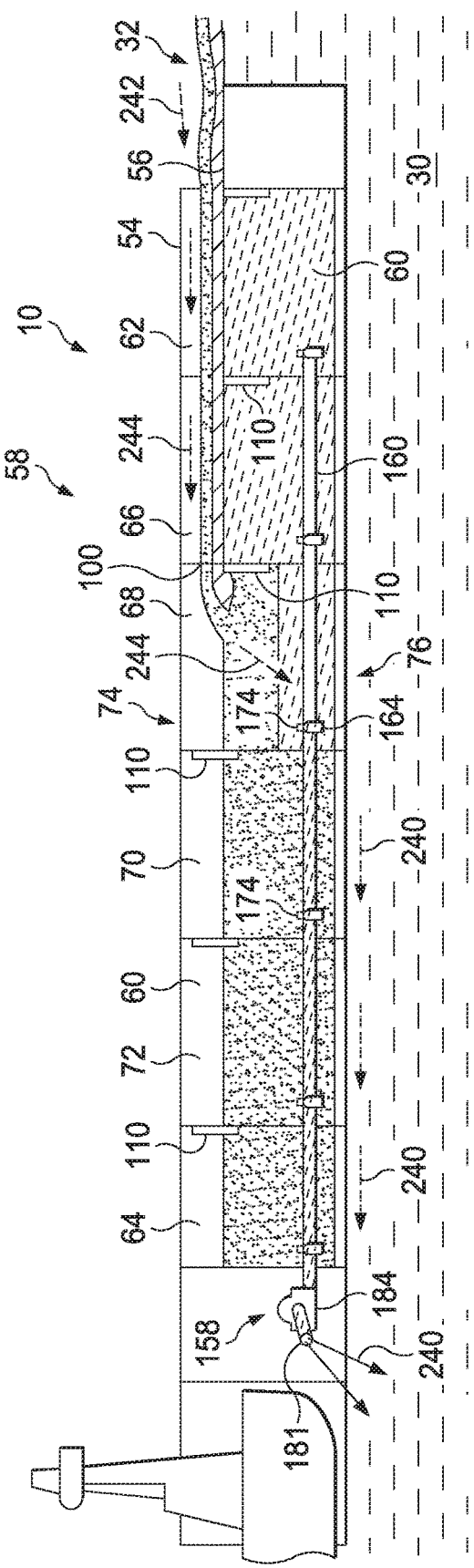
FIG. 16 is a side view of the exemplary vessel of FIG. 1 with the side shell removed to show exemplary interior cargo compartments and other components during exemplary debris recovery operations in accordance with an embodiment of the present disclosure.
Figure 17:
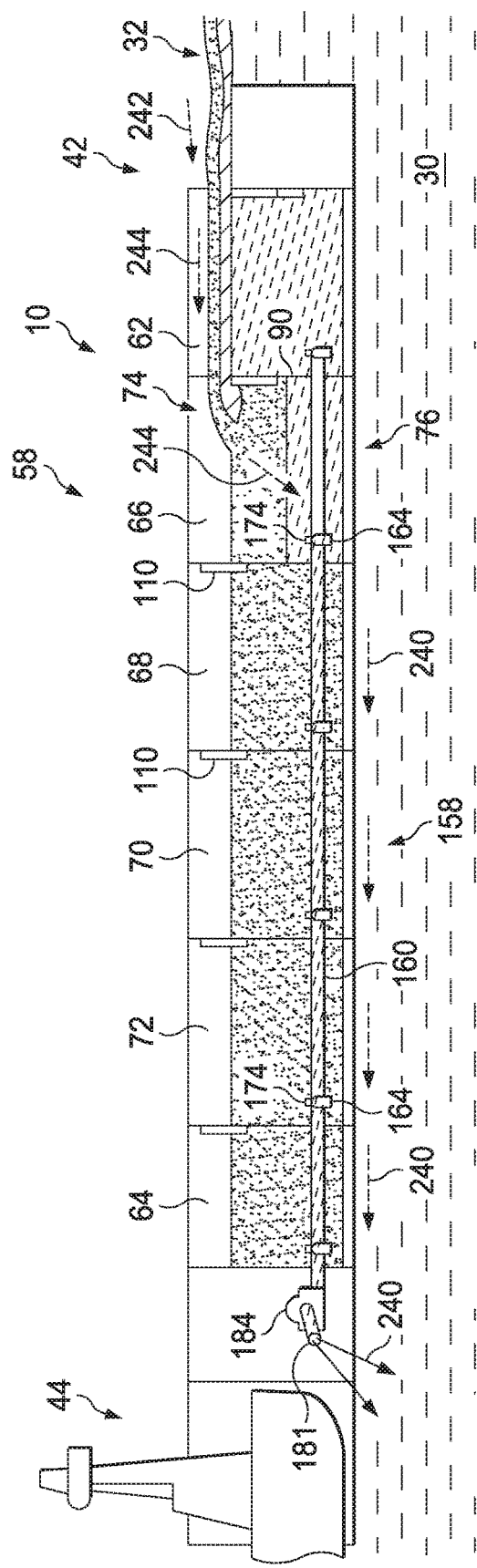
FIG. 17 is a side view of the exemplary vessel of FIG. 1 with the side shell removed to show exemplary interior cargo compartments and other components during exemplary debris recovery operations in accordance with an embodiment of the present disclosure.

If desired, the above exemplary process may then be repeated for cargo compartment 70 (e.g. FIGS. 15 & 16) by opening the valves 174 therein to allow sea water to be removed from the lower end 76 of that compartment 70 in the path of arrows 240. In this embodiment, substantially simultaneously, principally oil and some oily water preferably enters into the upper end 74 of, and fills, that cargo compartment 70, such as shown with flow arrows 244 (FIG. 15). When substantially all sea water in that cargo compartment 70 is removed (FIG. 16), it may be fluidly isolated, such as described above.

Figure 18:
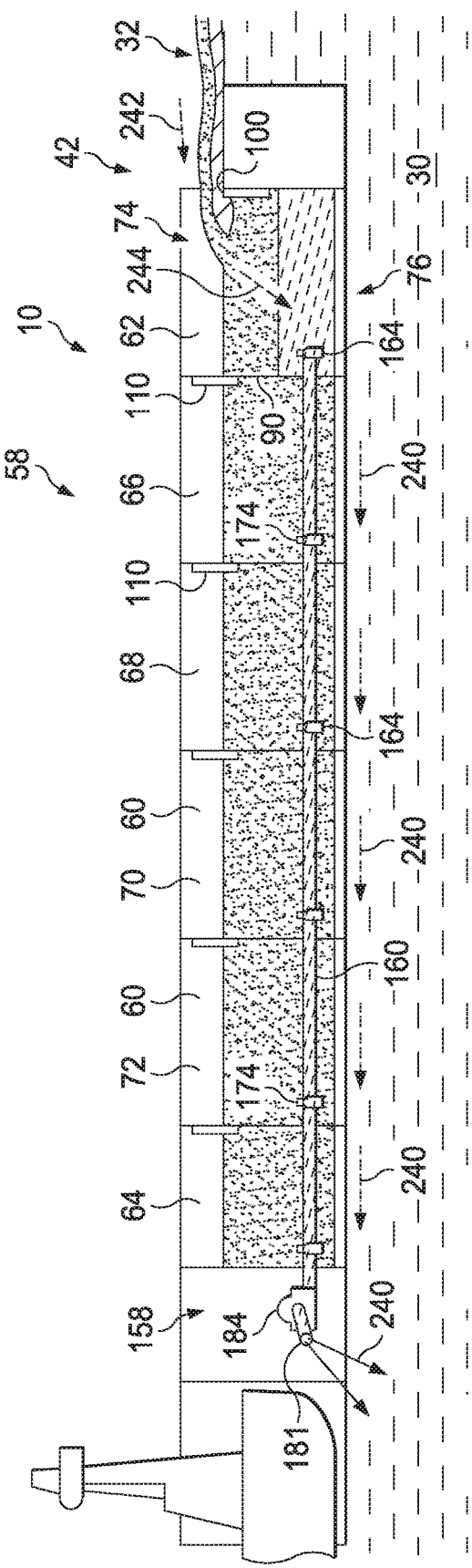
FIG. 18 is a side view of the exemplary vessel of FIG. 1 with the side shell removed to show exemplary interior cargo compartments and other components during exemplary debris recovery operations in accordance with an embodiment of the present disclosure.

In this embodiment, the above process may then be repeated for cargo compartment 68 (e.g. FIGS. 16 & 17), then cargo compartment 66 (e.g. FIGS. 17 & 18) and finally cargo compartment 62 (e.g. FIG. 18). If desired, one or more cargo compartment 60 may be skipped in the process by fluidly isolating that compartment 60 (and the other more rearward cargo compartments 60), such as described above. When substantially all sea water in the illustrated front cargo compartment 62 is removed, it is fluidly isolated, such as described above. It should be noted that the above process can be used with embodiments having any number (e.g. 2, 3, 4 etc.), form and configuration of cargo compartments 60. Thus, the methods of debris recovery of present disclosure are not limited by the number, form and configuration of compartments 60.

In accordance with many embodiments, oil 34 is separated from sea water 38 and collected as it moves across the vessel 10 and as sea water 38 is discharged from the vessel 10. In many embodiments, large amounts of floating contaminants or debris (e.g. oil) may be relatively quickly collected and removed from practically any body of water 30.

Referring back to the embodiment of FIG. 1, as the cargo compartments 60 are being emptied of sea water and at least partially filled with oil, liquid may be added to or removed from one or more of the other compartments 80, 84, 86, 88 in the vessel 10, such as to maintain the desired height of the vessel 10 in the body of water 30 (at the desired load line or other position). For example, sea water may be added to and removed from one or more of the side ballast tanks 80 on either, or both sides, of the vessel 10 as needed throughout the above debris recovery operations to maintain or refine the height of the vessel 10 in the body of water 30.

If desired, the vessel 10 may be moved in a forward direction (arrow 16, FIG. 2) through the oil spill area 36 at any desired speed, or at varying speeds, throughout, or at certain times, during the debris recovery operations. This may be desirable, for example, for strategic positioning of the front end 42 of the vessel 10 relative to the debris field or oil spill area 36 (like moving a vacuum cleaner over a dirty rug) as the discharge pump(s) 184 actively move liquid through the fluid removal system 158 as described above, to urge or assist in directing preferably oil and some oily water into the front cargo compartment 62 and through the other compartments 60, thus enhancing the active flow action caused by the discharge pump(s) 184, to cause the passive flow of liquid through the fluid removal system 158 when the discharge pumps 184 are not used, other desired purpose or a combination thereof. In the present embodiment, for example, the vessel 10 may be eased through the oil spill area 36 in the forward direction at a steady, slow speed during debris recovery operations. However, forward movement of the vessel 10 is not necessary in all embodiments.

Also during the debris recovery operations, if desired, the position of one or more of the exemplary open gates 110 may be varied as needed to affect or control the flow of liquid into the cargo compartments 60. For example, one or more of the gates 110 may be moved into one or another partially open position, such as to provide the optimal flow rate and/or liquid content (e.g. primarily oil) of the flowing liquid. If desired, the height of any of the open gates 110 relative to their associated openings 100 may be dynamically adjusted during debris recovery operations, such as via an electronic controller or computer-based control system. One or more variables, such as the weight, density and viscosity of the oil and/or other debris, substances or material in the sea water, may affect and be considered in varying the position of one or more gates 110 to achieve a desired flow rate and/or content of the liquid passing through the openings 100.

When debris recovery operations are completed, the exemplary fluid removal system 158 and all the cargo compartments 60 may be fluidly isolated from the body of water 30. For example, all the gates 110 and all valves 174, 188 may be closed and the discharge pumps 184 turned off.

If desired, all the gates 110 and/or cargo compartments 60 may be substantially sealed. In some embodiments, all the gates 110 and/or cargo compartments 60 may be completely (100%) sealed. The exemplary elongated boom(s) 190 may be moved to a stowed position and the vessel 10 transported to a desired location for offloading the contents (preferably primarily oil) in the cargo compartments 60. If desired, one or more other compartments on the vessel, such as the ballast tanks 80, may be emptied, such as to raise the height of the vessel 10 in the body of water 30 as it leaves the oil spill area 36. This may be desirable, for example, to minimize further oil contamination of the exterior surface of the side shell of the vessel 10 and/or allow cleaning/removal of any oil adhered thereto.

The contents of the cargo compartments 60 may be offloaded in any suitable manner. For example, the contents of the cargo compartments 60 may be offloaded to containers on one or more other vessel or onshore. In some embodiments, the oil and oily water may be offloaded through the openings 100 or other openings (not shown) in the cargo compartments 60, such as via one or more hose or other component. In other embodiments, the oil and oily water may be offloaded through the fluid removal system 158. If desired, the tug 14 used with a first vessel 10 as described above may be used to take a second similar vessel 10 to the oil spill area 36 to recover debris while the first vessel 10 is being offloaded.

Referring now to the embodiments of FIGS. 23-40, the illustrated vessel 10 (e.g. barge 12) includes a debris recovery system 58 utilizing a single cargo compartment 60 (e.g. front cargo compartment 62). As shown in FIG. 24, one opening 100 (intake opening 102) is provided in or proximate to the illustrated front bulkhead 92 to allow water and debris to enter the exemplary cargo compartment 60 from the body of water 30. The illustrated opening 102 is shown extending upwardly from the recessed front deck 56 with no upper boundary and generally across the width of the cargo compartment 60. Thus, the upper end 74 of the exemplary cargo compartment 60 at the front end 42 of the vessel 10 is essentially open to allow debris 40, 41 and probably some water 38 to wash, or flow, from the body of water 30 across or over the recessed front deck 56 and into the cargo compartment 60. However, the debris recovery system 58 may instead include more than one cargo compartment 60 and/or opening 102, and the opening(s) 102 may have any other desired configuration and location(s).

To illustrate that the debris recovery system 58 may be configured to recover a wide (potentially unlimited) variety and size of debris, the debris shown being recovered includes both small-sized debris 40 (e.g. oil 34, other chemicals, particulate pollutants, small biological materials (e.g. algae bloom), small plastic material (e.g. micro plastics), other small trash particles, etc.) and large-sized debris 41 (e.g. cups, bottles, other garbage, large biological materials (e.g. deceased marine life, algae bloom)). Thus, the debris recovery system 58 is not limited by type of debris or contaminants being collected, except as may be explicitly provided otherwise.

Figure 23:
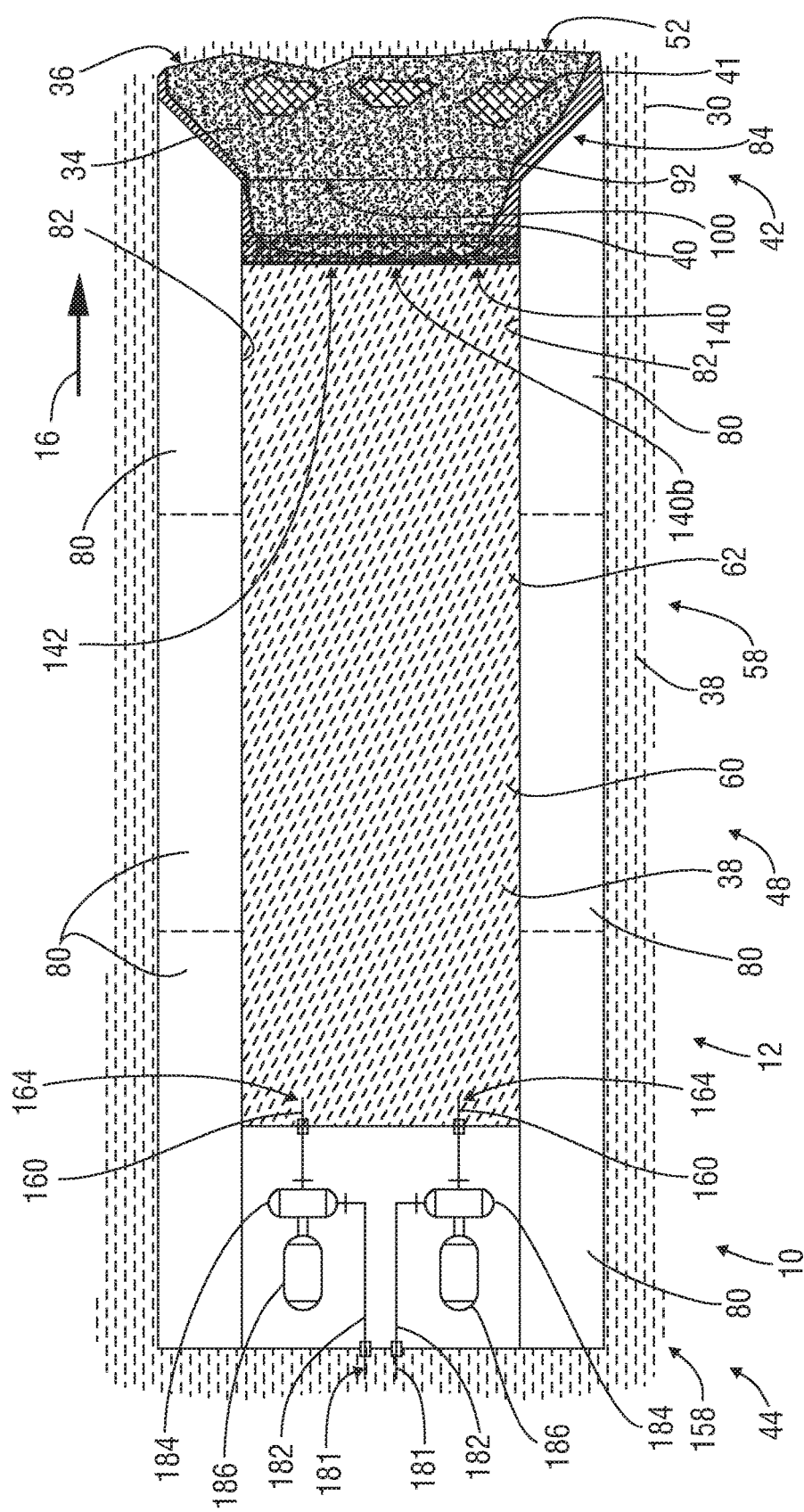
FIG. 23 is a plan view of an exemplary waterborne vessel with the decks removed to show parts of an exemplary debris recovery system having an exemplary pivoting-type inflow regulator in accordance with at least one embodiment of the present disclosure.

As shown in FIGS. 23 & 25, the exemplary debris recovery system 58 includes a fluid removal system 158 configured to allow the drainage of sea water 38 from the lower end 76 of the cargo compartment 60 and, at the same time, draw in debris (and often some water) to at least partially fill the cargo compartment 60, such as previously described herein. In this embodiment, the fluid removal system 158 is shown including two sets of suction conduits 160 drawing water from the same (single) cargo compartment 62, along with associated discharge pumps 184 (having associated motors 186), discharge pipe sections 182, discharge openings 181, valves and other components such as previously described herein. During use of the exemplary debris recovery system 58, at least one of the discharge pumps 184 will create suction in the associated suction conduit(s) 160 to concurrently (i) draw debris (and some water) from the body of water 30, through the intake opening 102, over the inflow regulator 140 and into the cargo compartment 60 and (ii) draw water 38 from the cargo compartment 60 into the associated suction conduit(s) 160. In many debris recovery scenarios, substantial pumping capacity may be necessary (e.g. to offset the influence of wave action, choppy surface conditions, substantial water intake due to forward travel speed, to optimize debris collection, etc.).

Referring to FIGS. 23-25, the illustrated debris recovery system 58 includes a single at least partially buoyant inflow regulator 140 configured to be positionable to at least substantially regulate, or limit, the inflow of debris (and probably some water) into the cargo compartment 60 from the body of water 30 to that debris (and some water) which is disposed at or near the surface 32 of the body of water 30 and which passes through the intake opening 102 over the IFR 140 during use of the debris recovery system 58, dampen or reduce the size of, or turbulence caused by, waves in the liquid passing through the opening(s) 100, maintain a steady flow of debris/water through the opening(s) 100, other desired purpose(s) or a combination thereof. It should be noted that, in other embodiments, more than one IFR 140 may be used. The exemplary IFR 140 will at least substantially regulate, or limit, inflow into the cargo compartment 62 to debris (and water) (i) that passes over the IFR 140 and (ii) that is disposed at or near (or comes from) the surface 32 of the body of water 30 by providing resistance to the water/debris passing through the opening 100, constraining the amount of water/debris able to pass into the compartment 60 to the top layer(s) (e.g. the least dense or most buoyant liquid/debris) moving through the opening 102. This is sometimes referred to herein and in the appended claims as the "intake resistance", "ability to constrain the inflow of fluids/debris into the cargo compartment(s) 60" and variations thereof. In many embodiments, the ideal intake resistance will cause the debris (e.g. oil) to rush or cascade over the front edge 142 of the IFR 140 and into the cargo compartment 60. In the case of oil and any other debris with similar relevant properties, the IFR 140 may use the cohesive property of the debris and/or overcome the adhesion of water and the debris to facilitate or encourage the inflow of mostly or all debris and little water.

With regard to all embodiments of the present disclosure and appended claims, there may be configurations, applications or periods of use of the system 58 during which only debris (and no water) are collected or drawn into the cargo compartment 60. Thus, any mention herein and in the claims of both debris and water being collected or drawn into the cargo compartment(s) 60 is meant to include and includes use of the system 58 to draw in only debris, only water or any combination thereof, unless expressly provided otherwise.

In many embodiments, the debris recovery system 58 will not at least substantially mix or emulsify the incoming debris and water (e.g. due to the intake resistance and/or wave dampening effect caused by the IFR 140, utilizing one or more controllable variables as discussed below), allowing the debris to float across the water in the cargo compartment 60. Often, the exemplary cargo compartment 60 will contain a defined layer of debris on top of the water, and may include an intermediate layer of mixed debris and water (e.g. FIG. 25). These consequences of many embodiments of the present disclosure will make on-board separation of debris and water easy, achievable and not overly onerous or time-consuming; allow substantial volumes of water to be discharged from the cargo compartment 60 and thus freeing up more on-board space for debris, other benefits or a combination thereof.

Depending on the particular type and conditions of use of the debris recovery system 58, the position (and movement) of the IFR 140 (e.g. relative to the surface 172 of the water/debris in the cargo compartment 60) and the rate of inflow/volume of debris (and some water) into the cargo compartment 60 may be regulated and varied as desired by selectively controlling one or more "controllable" variable. Some potential examples of controllable variables are the direction and speed of movement of the vessel 10, buoyancy of the IFR 140, the use of one or more IFR variable buoyancy mechanisms (such as described below), activity such as the amount of suction within the cargo compartment 60 (e.g. varying suction with the use of one or more variable speed discharge pumps 184 and/or multiple discharge pumps 184, manipulating one or more of valves (e.g. valves 174, 188) in the fluid removal system 158), or a combination thereof. One or more "non-controllable" variables can also influence the position of the exemplary IFR 140 and/or the rate/volume of inflow of debris/water into the cargo compartment 60 and can be factored in when deciding on the use of one or more controllable variable. Some potential examples of non-controllable variables include environmental factors (e.g. wind, rain, wave action, sea conditions, etc.), the type or nature (e.g. density, viscosity) of liquid in the cargo compartment 60 and body of water 30 (e.g. fresh verses salt water) and the thickness, composition and depth of the debris in the body of water 30, as well as the size or varying sizes of the debris, at the collection site.

The IFR 140 may have any suitable form, configuration, components and operation. Some examples of IFR(s) 140 are a "pivoting"-type IFR (e.g. FIGS. 23-34, 40) or "sliding"-type IFR (e.g. FIGS. 35-39). Still referring to FIGS. 23-25, in this embodiment (as well as the embodiments of FIG. 26-34, 40), the IFR 140 is an at least partially buoyant, pivoting-type IFR 140 and is thus pivotable relative to the vessel 10. The illustrated IFR 140 extends into the cargo compartment 60 across the width of the cargo compartment 60. In this embodiment, the IFR 140 is pivotably coupled to the vessel 10 proximate to the front end 42 thereof (see e.g. FIG. 26).

Referring specifically to FIG. 26, for example, the IFR 140, at or near its rear end 140a, may be pivotably coupled to the bulkhead 92, front recessed deck 56 or other portion(s) or component(s) of the vessel 10. The exemplary IFR 140 is thus pivotable relative to the surface 172 of liquid in the cargo compartment 60 as indicated with arrows 78. In this embodiment (as well as the embodiments of FIGS. 27-34, 40), the debris recovery system 58 is designed so that the rear end 140a of the IFR 140 will be below the surface 32 of the body of water 30 and the surface of debris/water entering the cargo compartment 60 during use of the debris recovery system 58. It should be noted, however, that the IFR 140 may be positioned so that its rear end 140a is not below the surface 32 of the body of water 30 and/or the surface of debris/water entering the cargo compartment 60, and may be coupled to the vessel 10 in any other desired manner (e.g. not across the entire width of the cargo compartment 60) and location.

Still referring to FIG. 26, the front end 140b of the illustrated IFR 140 is free-moving up and down (e.g. arrows 78) in the cargo compartment 60. (See also FIGS. 35-39). (In various figures (e.g. FIG. 25, 30, 35, 38) the illustrated IFR 140 is shown in multiple potential positions.) Further, the exemplary IFR 140 is sufficiently buoyant so that its front end 140b will float at or near the surface 172 of water/debris contained in the cargo compartment 60 during use of the debris recovery system 58. (See also FIGS. 35-39).

Referring now to FIGS. 27 & 28, the IFR 140 may have any suitable form, configuration, components, construction and operation. In this embodiment, the carrier 146 of the IFR 140 is a flat, rigid plate 150 and the float 144 is a buoyancy chamber 152 coupled to the plate 150, such as by welding, connectors (e.g. bolts), etc., proximate to the front end 140b of the IFR 140 to provide the desired buoyancy of the IFR 140. The plate 150 and buoyancy chamber 152 may be constructed of metal (e.g. aluminum, steel), wood, plastic, any other suitable material or combination thereof. If desired, the carrier 146 may include multiple plates 150, one or more support or frame members (such as to provide desired rigidity, sturdiness, durability, etc.), or may be semi-rigid, flexible or pliable, perforated, non-flat, convex or concave or have any other form, configuration and components.

In some embodiments, the IFR 140 may not include any separate floats 144 or buoyancy chambers 152. Any other suitable component(s) may be included to provide the desired buoyancy of the IFR 140. For example, the carrier 146 may include one or more buoyancy sections, cavities or chambers, and may be at least partially inflatable. For another example, the IFR 140 (e.g. carrier 146) may include foam or other material with floatation properties to provide the desired buoyancy or uplift of the front end 140b or other portion thereof. For another example, the IFR 140 may be, or include, one or more bladder bags coupled to the vessel 10 proximate to the front end 42 thereof and configured to provide the desired intake resistance. For example, the bladder bag(s) may be fixed buoyancy or variable buoyancy (e.g. as described below).

Still referring to FIGS. 27 & 28, the exemplary carrier 146 includes one or more seal members 155 or other components to provide or encourage at least substantial sealing engagement of the IFR 140 with the cargo compartment 60 during use of the debris recovery system 58. The seal members 155 may have any suitable form, configuration, components and operation. For example, one or more elongated gaskets 156 are shown coupled to the carrier 146 (e.g. with connectors (e.g. bolts), epoxy or other glue, opposing mating portions, by friction fit, or a combination thereof) extending along the side edges 146a, 146b of the carrier 146 to sealingly engage the interior opposing side walls 82 (e.g. FIGS. 24, 31) of the cargo compartment 60 or one or more other components adjacent thereto during use of the debris recovery system 58.

Figure 31:
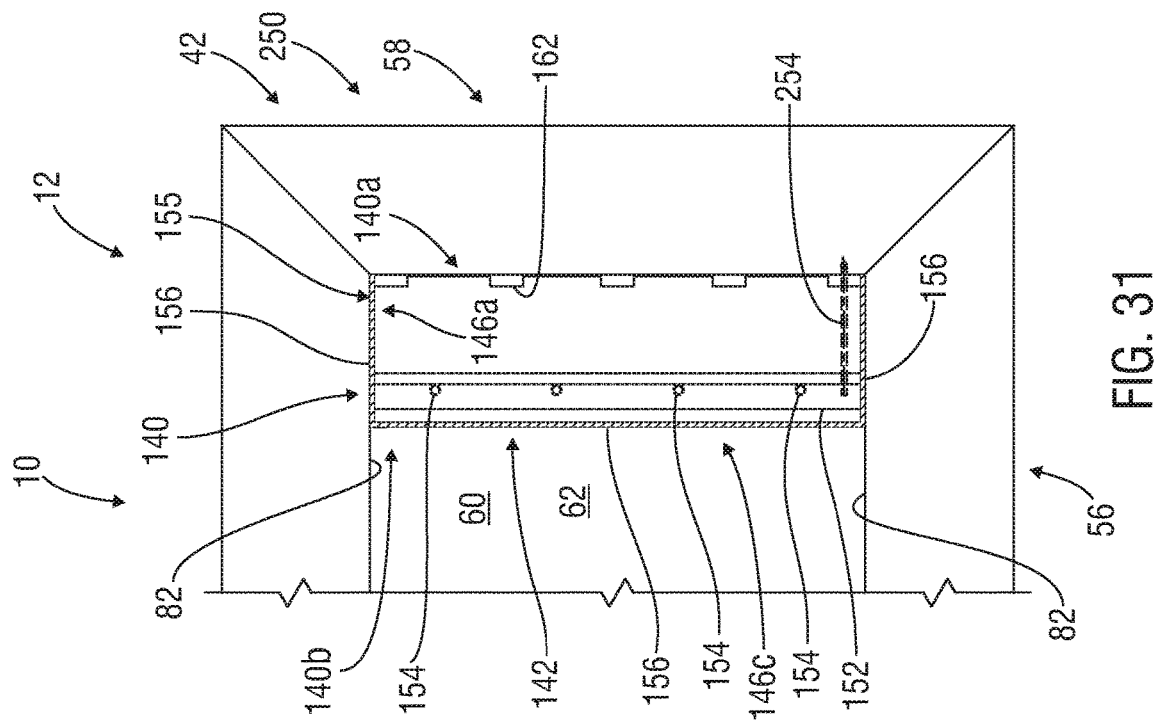
FIG. 31 is a plan view of part of the exemplary debris recovery system shown in FIG. 30.

In this embodiment, one or more seal members 155 (e.g. elongated gaskets 156) are also shown extending along the front edge 146c of the carrier 146 (see also FIGS. 31, 38). This may be useful, for example, to at least substantially sealingly engage the IFR 140 with the underside of the top deck 54 or other component(s) on the vessel 10 to at least substantially prevent the loss of liquid/debris from the cargo compartment 60 through the opening(s) 100 before or after debris recovery operations, or other desired purpose.

Although not shown in this embodiment, if desired, one or more seal members 155 (e.g. elongated gaskets 156) may be provided along the rear edge 146d of the carrier 146, such as to at least substantially seal any gap between the IFR 140 and the bulkhead 92 or other component, or other desired purpose. One or more seal members 155 may instead or additionally be provided on the bulkhead 92, side wall(s) 82 of the cargo compartment 60 or other components of the vessel 10 to at least substantially sealing engage the IFR 140, or other purpose. However, other embodiments may include fewer or no seal members 155 or different variations of sealing components.

Referring again to FIGS. 27 & 28, the exemplary IFR 140 may be pivotably coupled to the vessel 10 in any suitable manner. In this example, the carrier 146 includes multiple receivers 162 (e.g. pipe sections) at or proximate to the rear end 140a of the IFR 140 that fit and freely rotate over one or more hinge pin 148 anchored to the vessel 10 (e.g. the front recessed deck 56 (e.g. FIG. 26) or adjacent component(s)). However, any other suitable components may be used to provide the desired pivotable movement of the IFR 140 relative to the vessel 10. For example, the IFR 140 may instead include one or more pivot pin that is pivotably engaged with the vessel 10, or a different variation of corresponding pivotably mating portions or structures may be provided on the IFR 140 and vessel 10.

The exemplary buoyancy chamber 152 is shown coupled to the plate 150 proximate to the front end 140b of the IFR 140 and extends across almost the entire width of the carrier 146 to provide the desired buoyancy of the IFR 140 and intake resistance or other suitable purpose. For example, the location of the illustrated buoyancy chamber 152 proximate to the front end 140b of the IFR 140 may be farthest from the pivot mechanism(s) at the rear end 140a, such as to provide the greatest leverage advantage for the IFR 140 (see e.g. FIG. 26) or other purpose. The exemplary buoyancy chamber 152 includes at least one cavity provided therein for containing air (and/or other gases) so that it floats on liquid. As used herein and in the appended claims, the terms "air" and variations thereof in meant to include air and gases of any types and combinations. It should be noted that the buoyancy chamber 152 may be coupled to the carrier 146 or IFR 140 in any other suitable manner, at a different location on the carrier 146 and have any other desirable configuration, components and operation, or multiple buoyancy chambers 152 may be included, to provide the desired buoyancy, movement, positioning and/or intake resistance of the IFR 140, or other desired purpose.

Referring again to FIGS. 23-29, this embodiment is an example of a "fixed-buoyancy" IFR 140 because it includes no internal mechanism for varying the buoyancy thereof. Thus, the internal cavity(ies) of the exemplary buoyancy chamber 152 is sized to hold sufficient air to provide the desired buoyancy of the IFR 140. For example, referring to FIG. 26, the exemplary buoyancy chamber 152 may be sized and situated to position the IFR 140 so that the front edge 142 thereof will be above the surface 172 of the water and/or debris within the cargo compartment 60 in a "rest" or "non-operating" position (e.g. when no suction is provided in the cargo compartment 60) after the cargo compartment 60 has been filled with water and before the start of debris recovery operations. FIG. 26 thus reflects an exemplary "rest" position (see also FIGS. 32, 35). For another example referring to FIG. 29, the exemplary buoyancy chamber 152 may be sized and situated to position the IFR 140 so that the front edge 142 thereof will be below the surface 172 of the water and/or debris in the cargo compartment 60 during debris recovery operations as the vessel 10 moves forward and/or suction (e.g. via discharge pump(s) 184) has commenced in the cargo compartment 60. The position of the exemplary IFR 140 in FIG. 29 reflects an exemplary "operating" position that provides the desired intake resistance (see also FIGS. 33-34). In this exemplary operating position of the illustrated IFR 140, the debris (particularly oil 34) tends to cascade, or rush, over the front edge 142 of the illustrated IFR 140 and fill the cargo compartment 60 as water 38 is being removed therefrom. (See also FIG. 33-34). In the exemplary embodiments, the position of the IFR 140 often may tend to remain relatively static during debris recovery operations (e.g. in the position of FIGS. 29, 33) when the controllable and non-controllable variables remain constant. However, the exemplary IFR 140 may reciprocate, flutter, float or constantly adjust position in real-time throughout or intermittingly during operations.

If desired, the IFR 140 may have an "extended" or "closed" position, such as to close off the front end of the cargo compartment 60 or the opening 102, situate the front end 142 thereof high enough to contact, engage to at least substantially sealingly engage the underside of the top deck 54 of the vessel 10 (or other component(s) on the vessel 10) to at least substantially prevent the loss of liquid/debris from the cargo compartment 60 through the opening(s) 102 before or after debris recovery operations, or other desired purpose(s). For example, the "rest position" as described above (e.g. FIGS. 26, 32) may also serve as the "extended" position. For another example, the IFR 140 may float or be movable (e.g. manually or with a positive movement device, such as one or more mechanical or pneumatic drivers (e.g. as described above with respect to the exemplary gates 110), etc.)) to a higher position, such as shown in FIGS. 35 & 40. In FIG. 40, the exemplary IFR 140 biasingly engages an IFR catcher 300 provided on the vessel 10. The IFR catcher 300 may have any suitable form, configuration and operation. In this example, the IFR catcher 300 includes a first stop 302 configured to at least substantially sealingly engage the front edge 142 of the IFR 140 and a second stop 304 configured to engage the upper front surface of the IFR 140. The illustrated first and second stops 302, 304 are elongated sections of angle iron coupled to the underside of the top deck 54 and/or the side walls 82 of the cargo compartment 60. However, the stops 302, 304 may have any other suitable form, configuration and operation. In other embodiments, the IFR 140 may be releasably securable to the IFR catcher 300 (e.g. with one or more hooks, latches, magnets, mechanical connectors) to secure the IFR 140 in the extended position (e.g. to prevent debris from sloshing out of the cargo compartment 60 during transport after debris recovery operations). For another example, the "closed" position of the IFR 140 and techniques for moving it into and out of a "closed" position may be similar to that described above for the gates 110 and shown in FIGS. 1-22.

Now referring to FIGS. 35-39, an exemplary sliding-type, fixed-buoyancy IFR 140 is shown. The illustrated IFR 140 (a.k.a. gate 110) is at least partially buoyant and situated in an upright position so that the entire IFR 140 is movable up and down (as indicated with arrows 294) relative to the cargo compartment 60, bulkhead 92 and intake opening 102 to provide the desired intake resistance. In this example, when installed, the IFR 140 is perfectly vertical (relative to a centerline of the vessel 10) or nearly perfectly vertical. However, in other embodiments, the IFR 140 may be angled or substantially vertical. Thus, the precise orientation of the sliding-type IFR 140 is not limiting upon the present disclosure and appended claims (unless explicitly noted otherwise), so long as the IFR 140 is movable up and down and has one or more of the capabilities provided herein or which is evident from this disclosure and the appended drawings and claims.

The sliding-type IFR 140 may have any suitable form, configuration and operation. In this embodiment, as shown in FIG. 36, the IFR 140 includes a carrier 146 (e.g. plate 150) and a float 144 (e.g. buoyancy chamber 152) of the same type and having the same features as described above and shown in the appended drawings with respect to the exemplary pivoting-type IFR 140 (except those details relating to the pivotability thereof). Accordingly, all of the disclosure herein with respect to the carrier 146 and float 144 (e.g. the buoyancy chamber 152) of the exemplary pivoting-type IFR 140, (except that relating to the pivotability thereof) is incorporated herein by reference in its entirety.

Similarly as described above, the IFR 140 of these embodiments may not include any separate floats 144 or buoyancy chambers 152. Any other suitable component(s) may be included to provide the desired buoyancy of the IFR 140. For example, the carrier 146 may include one or more buoyancy sections, cavities or chambers, and may be at least partially inflatable. For another example, the IFR 140 (e.g. carrier 146) may include foam or other material with floatation properties to provide the desired buoyancy or uplift of the front end 140b or other portion thereof. For another example, the IFR 140 may be, or include, one or more bladder bags coupled to the vessel 10 proximate to the front end 42 thereof and configured to provide the desired intake resistance. For example, the bladder bag(s) may be fixed buoyancy or variable buoyancy.

Still referring to FIG. 36, the carrier 146 may include multiple plates 150, one or more support or frame members, such as to provide rigidity, sturdiness, durability, etc. to the plate(s) 150, or may be semi-rigid, flexible or pliable, perforated, non-flat, convex or concave or have any other form, configuration and components. In this embodiment, the IFR 140 includes left and right side frames 282, 283 and top and bottom edge frames 284, 285. The illustrated frame members 282-285 extend inwardly from the plate 150 around the perimeter thereof, such as to provide stiffness to the IFR 140, assist in guiding the movement of the IFR 140, other suitable purpose or a combination thereof.

Referring to FIGS. 35-37, in this embodiment, one or more guide pins 288 are shown protruding outwardly from each of the side frames 282, 283 and configured to move freely up and down (arrows 294) within respective left and right guide rails 290, 292. The guide pins 288 and guide rails 282, 292 may have any suitable form, configuration and operation. In this example, as shown in FIG. 36, two guide pins 288 are provided on each side of the IFR 140, but only one or more than two (e.g. 3, 4, 5, etc.) may be included. The illustrated guide pins 288 include a circular plate rigidly coupled (e.g. by weld and/or mechanical connectors) to a pipe section, which is rigidly coupled (e.g. by weld and/or mechanical connectors) to the side frames 282, 283 of the IFR 140. In other embodiments, the guide pins 288 may include a rotatable or non-rotatable wheel or other guide mechanism(s). As shown in FIG. 37, the exemplary guide rails 290, 292 each include a pair of elongated sections of angle-iron rigidly coupled (e.g. by weld and/or mechanical connectors) to the side walls 82 of the cargo compartment 60 or other part(s) or component(s) of the vessel 10. The exemplary IFR 140 slides freely up and down within the guide rails 290, 292, which define and limit the path of the IFR 140 (e.g. FIG. 35). The guide rails 290, 292 may be oriented perfectly or near-perfectly vertically, substantially vertically or have another desired orientation. Thus, the precise orientation of the guide rails 290, 292 is not limiting upon the present disclosure and appended claims (unless explicitly noted otherwise).

Referring specifically to FIG. 35, in this embodiment, the debris recovery system 58 is designed so that the IFR 140 is free-moving up and down in the cargo compartment 60 (e.g. arrows 294). The front end 140b thereof will float at or near the surface 172 of liquid contained in the first cargo compartment 60 (or moving into it) during use of the debris recovery system 58 to provide the desired intake resistance. Specifically, the front end 140b of the exemplary IFR 140 is shown extending across the intake opening 102 so the debris will flow, or cascade, over the front edge 142 of the IFR 140 as desired and similarly as described and shown herein with respect to the pivoting-type IFR 140. FIG. 35 thus shows an exemplary optimal operating position of the IFR 140 during debris recovery operations. The IFR 140 shown in shadow illustrates an exemplary extended or closed position of the IFR 140.

Referring now to FIGS. 38 & 39, if desired, the exemplary IFR 140 may include one or more seal members 155 or other components to provide or encourage at least substantial sealing engagement of the IFR 140 with the cargo compartment 60, bulkhead 92 and/or other components. The seal members 155 may have any suitable form, configuration, components and operation. For example, one or more elongated gaskets 156 are shown coupled to the carrier 146 (e.g. with connectors (e.g. bolts), epoxy or other glue, opposing mating portions, by friction fit, or a combination thereof) and extending along the side edges 146a, 146b of the carrier 146 (e.g. along the outside surfaces of the left and right frames 282, 283) to at least substantially sealingly engage the left and right guide rails 290, 202, respectively, or one or more other components adjacent thereto. In this embodiment, one or more elongated gaskets 156 are also shown extending along the front edge 146c of the carrier 146. If desired, one or more seal members 155 (e.g. elongated gaskets 156) may also be provided along the rear edge 146d of the carrier 146. One or more seal members 155 may instead or additionally be provided on the bulkhead 92, side wall(s) 82 of the cargo compartment 60 or other components of the vessel 10 for the same purpose. For example, one or more elongated gaskets 156 are shown coupled to the inner wall of the bulkhead 92 across substantially the entire width of the intake opening 102 and/or cargo compartment 60, such as to at least substantially seal the gap 296 (FIG. 37) between the bulkhead 92 and the IFR 140 or other desired purpose(s).

In an exemplary use of the illustrated sliding-type IFR 140, the IFR 140 may be positioned within the cargo compartment 60 with the guide pins 288 inserted into the respective rails 290, 292 before the top deck 54 (or at least the foremost section thereof) is secured to the vessel 10. If the debris recovery system 58 includes a variable buoyancy system 250 (such as described below), the system 250 may be used to selectively position the front end 140b of the IFR 140 as desired. Otherwise, the debris recovery system 58 can be used to provide the desired intake resistance, similarly as described above with respect to the pivoting-type IFR 140.

Referring now to FIGS. 30-34 & 40, the debris recovery system 58 (of any of the above embodiments, including FIGS. 35-39) may include one or more internal mechanisms for varying the buoyancy of the exemplary IFR 140. An IFR 140 used in a variable buoyancy arrangement is sometimes referred to herein as a "variable-buoyancy" IFR 140. The illustrated system 58 includes a variable buoyancy system 250 associated with the IFR 140 and configured to allow the selective insertion and removal of air, gas or a combination thereof into/from the IFR 140 to influence its buoyancy. For example, when it is desirable to decrease the buoyancy of the exemplary IFR 140, air may be allowed to escape from the exemplary buoyancy chamber 152 and be replaced by liquid in the cargo compartment 60 (e.g. FIG. 33). Conversely, when it is desirable to increase the buoyancy of the illustrated IFR 140, additional air may be injected into the buoyancy chamber 152 to displace liquid out of the buoyancy chamber 152 (e.g. FIG. 34). In embodiments of the debris recovery system 58 not including any buoyancy chambers 152 (e.g. an IFR 140 with one or more bladder bags), the variable buoyancy system 250 could similarly be used with other inflatable components of the IFR 140.

The variable buoyancy system 250 may have any suitable form, configuration, components and operation. In this embodiment, referring to FIGS. 30 & 31, the buoyancy chamber 152 includes four water exchange openings 154 (e.g. formed in the bottom 153 of the buoyancy chamber 152 and always open) to allow liquid from the cargo compartment 60 to be able to enter the buoyancy chamber 152. However, any other suitable form, configuration, quantity (e.g. 1-3, 5 or more) and location of the water exchange openings 154 may be used.

The exemplary variable buoyancy system 250 includes at least one air exchange conduit 254 (e.g. flexible hose, steel pipe, etc.) fluidly coupled to the buoyancy chamber 152 and configured to allow the selective insertion and removal of air (and/or gas(es)) into the chamber 152. For example, one or more air compressors 258 may be provided on the vessel 10 for selectively supplying compressed air into the buoyancy chamber 152 via the air exchange conduit 254, such as through one or more air exchange riser 262 (e.g. steel pipe, flexible tubing, etc.). However, any other arrangement of components may be used to selectively provide air in the buoyancy chamber 152.

Figure 30:
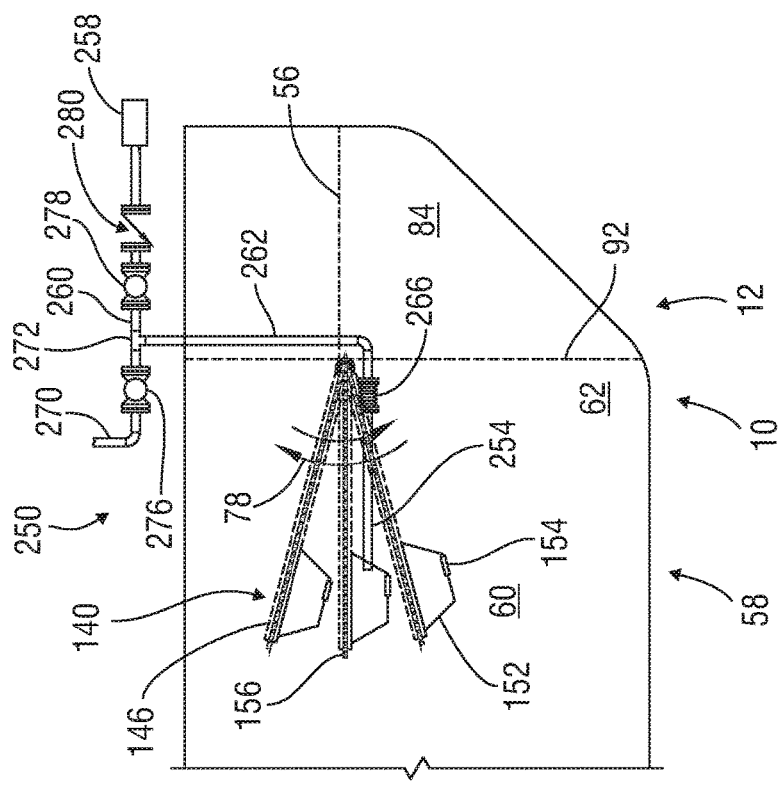
FIG. 30 is a side, cut-away view of part of the exemplary waterborne vessel of FIG. 23 with the side shell removed and the exemplary debris recovery system including an exemplary variable buoyancy system in accordance with one or more embodiments of the present disclosure.

Still referring to FIGS. 30-31, if desired, since the illustrated IFR 140 will move relative the vessel 10 (e.g. arrows 78), one or more flex connector 266 may be strategically placed between the air exchange conduit 254 and air exchange riser 262 to allow movement of the air exchange conduit 254 (with the IFR 140) relative to the air exchange riser 262 (and/or other components) without disconnecting or damaging the air exchange conduit 254, buoyancy chamber 152 and/or other components. The flex connector 266 may have any suitable form, configuration and operation. For example, the flex connector 266 may be a flexible hose or expansion joint.

In this embodiment, the variable buoyancy system 250 also includes one or more discharge conduits 270 (e.g. to the atmosphere) fluidly coupled to the buoyancy chamber 152 to allow air to be selectively discharged therefrom. For example, the illustrated air exchange riser 262 is shown fluidly coupled to both the air compressor 258 (via air supply branch 260) and at least one air discharge conduit 270, such as at a T-connector 272. In this embodiment, the variable buoyancy system 250 also includes at least one relief valve 276 and at least one fill valve 278 that may be actuated to allow/disallow air to be selectively supplied into the buoyancy chamber 152 from the air compressor 258 (or other source) and discharged out of the buoyancy chamber 152 via the discharge conduit 270. One or more check valves 280 may be included in the variable buoyancy system 250 (e.g. in the supply branch 260 and/or one or more discharge conduit 270), such as to allow only one-way air flow in desired sections of the variable buoyancy system 250.

Figure 33:
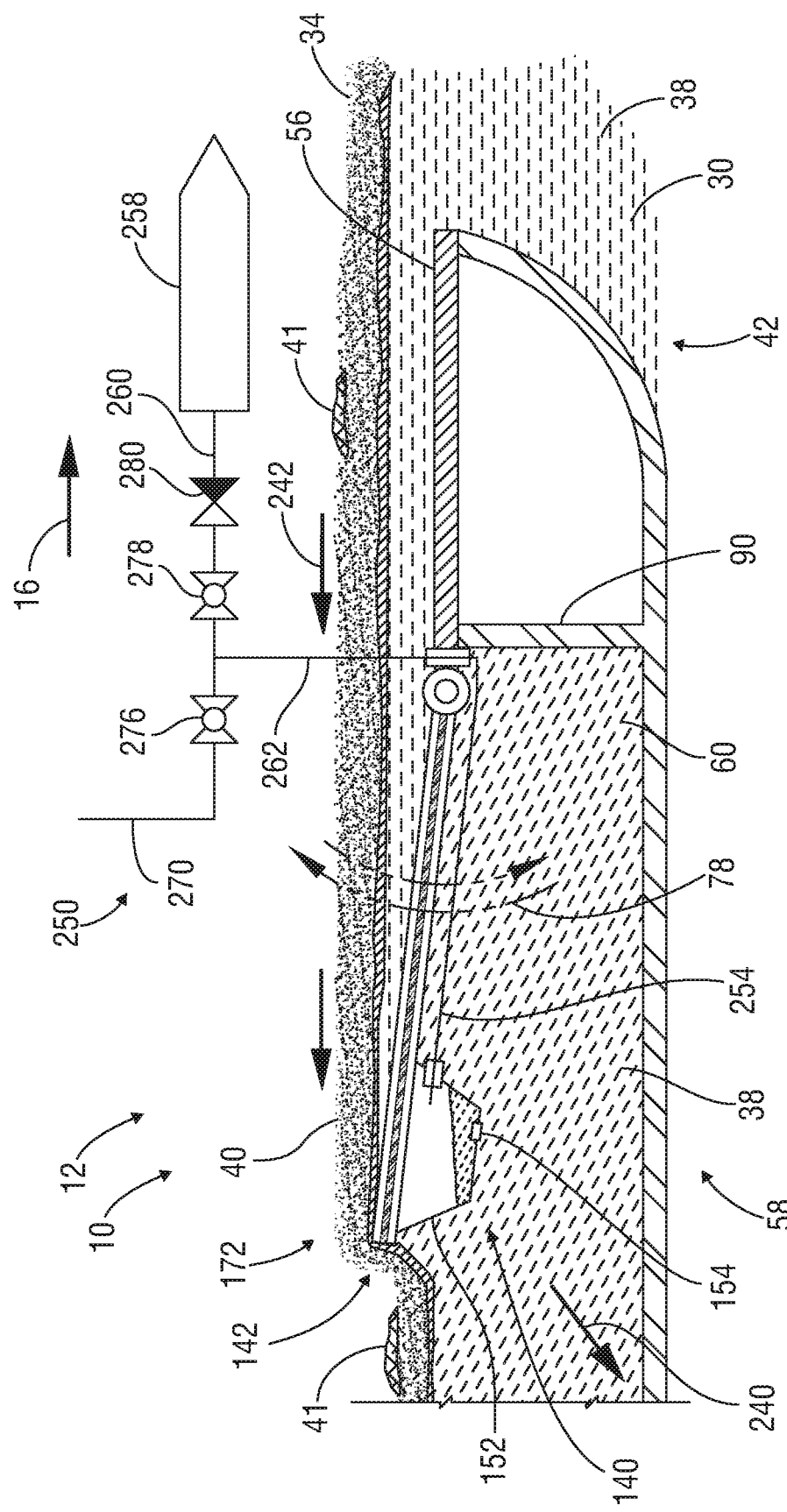
FIG. 33 is a side, partial cross-sectional, view of the exemplary waterborne vessel of FIG. 23 with the side shell removed and the exemplary debris recovery system including the exemplary variable buoyancy system of FIG. 30 and showing the exemplary inflow regulator in a first exemplary operating position in accordance with one or more embodiments of the present disclosure.
Figure 34:
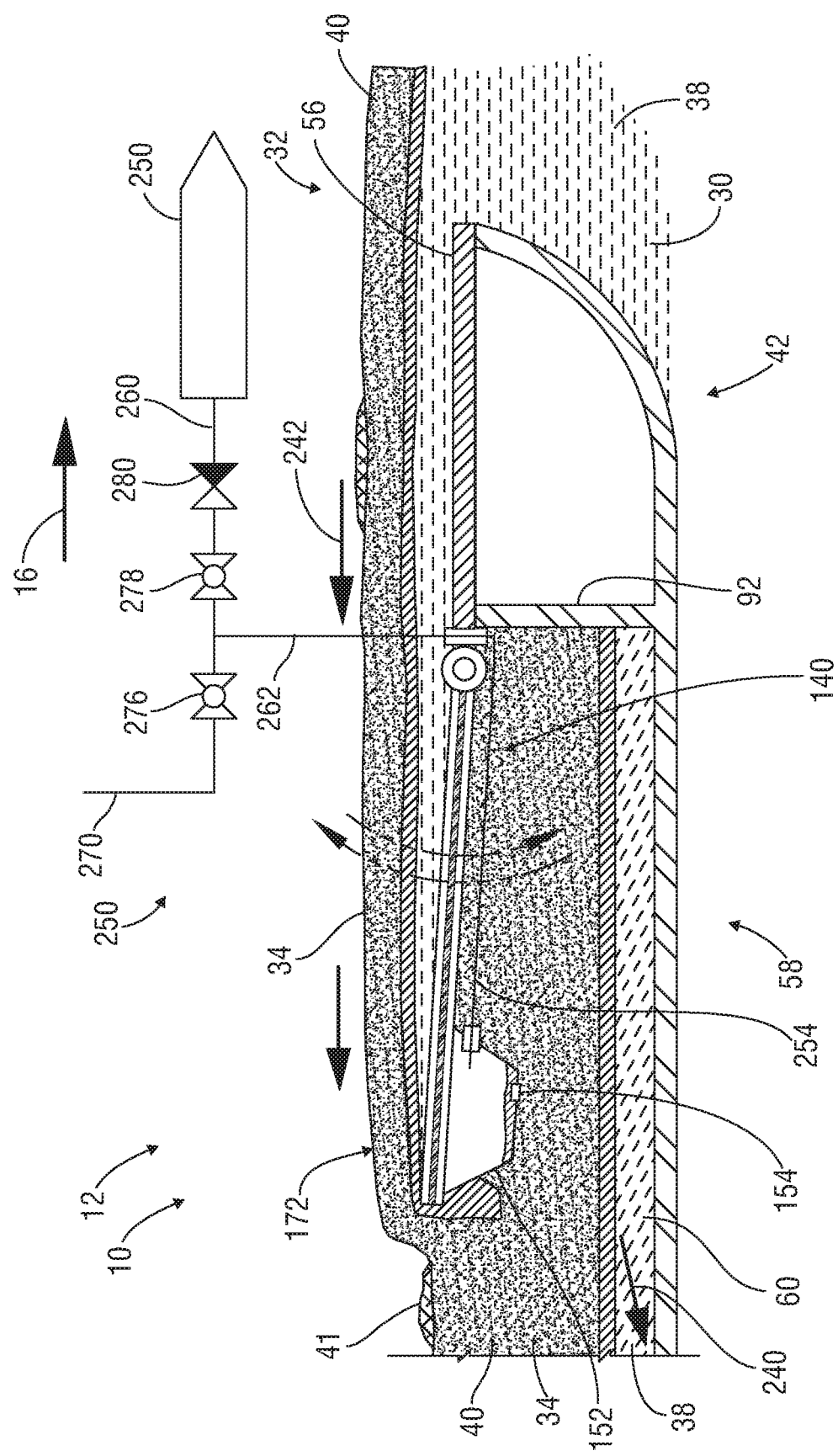
FIG. 34 is a side, partial cross-sectional, view of the exemplary waterborne vessel of FIG. 23 with the side shell removed and the exemplary debris recovery system including the exemplary variable buoyancy system of FIG. 30 and showing the exemplary inflow regulator in a second exemplary operating position in accordance with one or more embodiments of the present disclosure.

Referring now to FIGS. 32-34, an example use of the illustrated variable buoyancy IFR 140 will now be described. FIG. 32 represents a potential start, or rest, position of the variable buoyancy IFR 140 after the cargo compartment 60 has been filled with water and before the start of debris recovery operations. The exemplary buoyancy chamber 152 is filled with air (either naturally or by injecting air therein such as described above) so that the front edge 142 of the IFR 140 is positioned above the surface 172 of the water within the cargo compartment 60, representing an exemplary rest or non-operating position of the IFR 140.

Referring to FIG. 33, if it is desired to decrease the buoyancy of the IFR 140 (e.g. move the exemplary IFR 140 down into a lower position relative to the surface 172 of the water/debris in the cargo compartment 60) with the use of the variable buoyancy system 250, the fill valve 278 is closed and the relief valve 276 opened, allowing a desired volume of air to escape from buoyancy chamber 152 and be replaced by liquid flowing up into the buoyancy chamber 152 through the water exchange opening(s) 154. When the desired position of the IFR 140 is achieved, the valve 276 is closed. This may be desirable in various scenarios, such as to initially establish the optimal operating position of the IFR 140 and optimal intake resistance, when the forward movement of the vessel 10 is decreased or stopped, if the thickness of the debris (e.g. oil) in the body of water 30 increases and it is desired to allow more debris to enter the cargo compartment 60, or other situations. In FIG. 33, some liquid has thus entered the illustrated buoyancy chamber 152, positioning the IFR 140 lower in the cargo compartment 60 as compared to its rest position in FIG. 32. FIG. 33 thus illustrates the exemplary buoyancy chamber 152 partially flooded and the IFR 140 in an exemplary operating position. In this illustration, suction in the cargo compartment 60 has also commenced and/or the vessel 10 is moving in the forward direction, and debris (small-sized debris 40, large-sized debris 41 and some mixed debris/water) is shown flowing or cascading over the front edge 142 of the IFR 140 into the cargo compartment 60 as water 38 is being removed therefrom.

There may be various situations in which it is desirable to increase the buoyancy of the IFR 140 with the use of the variable buoyancy system 250. For example, as the cargo compartment 60 becomes more filled with oil (or other similar low density debris), the IFR 140 will tend to float lower in the cargo compartment 60 and it may be desirable to raise up the IFR 140 to maintain an optimal operating position thereof. For another example, it may be desirable to increase the buoyancy of the IFR 140 upon moving the vessel 10 forward from a stationary position, upon increasing the forward speed of the vessel 10 or upon increased wind or wave action (in each case air pressure providing increased push on the IFR 140). To increase buoyancy of the exemplary IFR 140 using the illustrated variable buoyancy system 250, the relief valve 276 is closed, the fill valve 278 is opened and the desired volume of air is injected into the buoyancy chamber 152 from the air compressor 258 (or other source) to push out the desired volume of liquid from inside the buoyancy chamber 152 through the water exchange opening(s) 154. When the desired position of the IFR 140 is achieved, the valve 274 is closed. FIG. 34 thus shows a less partially flooded buoyancy chamber 152 than in FIG. 33.

In some embodiments, the variable buoyancy system 250 may be useful on an ongoing basis to continually, or as necessary, selectively adjust the position of the IFR(s) 140 in the cargo compartment(s) 60 and influence (e.g. improve) the efficiency and effectiveness of debris collection operations (e.g. collect as much debris as quickly as possible). Further, the variable buoyancy system 250 may be used in conjunction with one or more other controllable or uncontrollable variables, as mentioned above.

In accordance with various embodiments of the present disclosure, the debris recovery system 58 in able to recover, or ingest, and store large amounts of debris (e.g. oil) on the vessel 10 without causing any or significant additional mixing, or emulsification, of the debris with water. By so avoiding further emulsification, the need to separate the debris and water on board is minimized or reduced, reducing the need for extensive separation equipment, allowing for the discharge of a high volume of water or high ratio of water to debris, reducing the time and cost of operations and storage and transport of the recovered debris before final disposal or recycling, other purpose or a combination thereof.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. System useful for collecting debris from a body of water on a vessel moveable in the body of water and having at least one cargo compartment and at least one intake opening fluidly coupling the at least one cargo compartment with the body of water during debris collection operations, the system comprising:

at least one discharge pump having sufficient pumping capacity both when the vessel is moving and stationary to concurrently (i) draw water and debris from the body of water, through the at least one intake opening and into the at least one cargo compartment and (ii) remove water and little or no debris from the at least one cargo compartment; and at least one inflow regulator that can at least partially free-float at or near the surface of liquid in the vessel and limit the water and debris drawn from the body of water into the at least one cargo compartment to primarily debris and water that passes over the at least one inflow regulator during debris collection operations and can be selectively actuated to adjust the height of at least a portion thereof relative to the surface of liquid in the vessel during debris collection operations.

2. The system of claim 1 wherein the at least one inflow regulator is a pneumatically-actuated variable buoyancy inflow regulator.

3. The system of claim 2 further including a variable buoyancy system that can be selectively actuated to allow air to escape from the at least one inflow regulator and be replaced with liquid when it is desired to decrease the buoyancy of the at least one inflow regulator and height of at least a portion of the at least one inflow regulator relative to the surface of liquid in the vessel during debris collection operations and can be selectively actuated to provide air into the at least one inflow regulator and force liquid out of the at least one inflow regulator when it is desired to increase the buoyancy of the at least one inflow regulator and height of at least a portion of the at least one inflow regulator relative to the surface of liquid in the vessel during debris collection operations.

4. The system of claim 2 wherein the at least one inflow regulator includes at least one pneumatically-actuated buoyancy chamber.

5. The system of claim 4 further including at least one variable buoyancy system configured to allow liquid flow into and out of the at least one buoyancy chamber to change the height of at least part of the at least one inflow regulator relative to the surface of the liquid in the vessel.

6. The system of claim 4 further including at least one water exchange opening associated with the at least one buoyancy chamber and which can be submerged in liquid in the vessel and allow liquid flow into and out of the at least one buoyancy chamber to change the buoyancy of the at least one inflow regulator and the height of at least part of the at least one inflow regulator relative to the surface of the liquid in the vessel.

7. The system of claim 6 further including at least one air exchange conduit fluidly coupled to the at least one buoyancy chamber to allow the selective insertion of air into the at least one buoyancy chamber to increase the buoyancy of the at least one inflow regulator and the height of at least part of the at least one inflow regulator relative to the surface of liquid in the vessel during debris collection operations.

8. The system of claim 7 wherein the at least one air exchange conduit can be used to allow the escape of air from the at least one buoyancy chamber to decrease the buoyancy of the at least one inflow regulator and height of at least part of the at least one inflow regulator relative to the surface of liquid in the vessel during debris collection operations.

9. The system of claim 7 further including at least one air supply source fluidly coupled to the at least one air exchange conduit.

10. The system of claim 7 further including at least one flex connector coupled to the at least one air exchange conduit to allow movement of the at least one air exchange conduit relative to the vessel without disconnecting or damaging the air exchange conduit.

11. The system of claim 1 wherein the at least one inflow regulator includes at least one selectively inflatable and deflatable bladder bag.

12. The system of claim 1 wherein the at least one inflow regulator has first and second ends and includes, at least one buoyant portion positioned closest to the first end, further wherein the second end is configured to be pivotably coupled to the vessel below the surface of liquid in the vessel.

13. The system of claim 12 wherein the at least one inflow regulator has a front edge proximate to the least one buoyant portion thereof and positioneable relative to the surface of the liquid in the vessel to cause floating debris entering the vessel through the at least one intake opening to cascade there-over and into the at least one cargo compartment.

14. The system of claim 1 wherein the at least one inflow regulator includes one or more sliding-type inflow regulators configured to be vertically oriented in the vessel.

15. The system of claim 14 wherein the at least one sliding-type inflow regulator can be at least one among: selectively mechanically, hydraulically and/or pneumatically actuated to adjust the height of at least a portion thereof relative to the surface of liquid in the vessel during debris collection operations and assist in maximizing the volume of floating debris collected in the at least one cargo compartment and/or minimizing the volume of water that enters the at least one cargo compartment during debris collection operations.

16. The system of claim 1 wherein the at least one inflow regulator is moveable into at least one closed position to at least substantially entirely block the entry of water and floating debris from entering the at least one cargo compartment through the at least one intake opening.

17. The system of claim 1 wherein the at least one discharge pump is selectively adjustable to vary the velocity of water and debris entering the vessel through the at least one intake opening.

18. The system of claim 1 wherein the at least one inflow regulator is configured to utilize the cohesive property of the floating debris and/or overcome the adhesion of water and the floating debris to encourage the passage of at least substantially only floating debris into the at least one cargo compartment.

19. The system of claim 1 wherein the at least one inflow regulator is selectively moveable up and down relative to the surface of liquid in the vessel in response to or anticipation of at least one among: a change in wave action of water entering the vessel through the at least one intake opening, a change in the velocity of water entering the vessel through the at least one intake opening, a change in the velocity of the vessel and/or a change in the thickness and/or density of floating debris entering the vessel through the at least one intake opening.

20. The system of claim 1 wherein the at least one inflow regulator can be selectively moved up and down relative to the surface of liquid in the vessel in order to at least substantially limit the inflow of floating debris into the at least one cargo compartment to that debris disposed at or near the surface water passing through the at least one intake opening into the vessel, reduce the size and/or turbulence of waves in the water passing through the at least one intake opening into the vessel, maintain an at least substantially steady flow of floating debris passing into the at least one cargo compartment or a combination thereof.

21. A method of collecting debris from a body of water onto a vessel moveable in the body of water and having at least one intake opening fluidly coupling at least one cargo compartment of the vessel with the body of water, the method comprising:
    selectively actuating at least one discharge pump on the vessel both when the vessel is moving and stationary to concurrently (i) draw water and debris from the body of water, through the at least one intake opening and into the at least one cargo compartment and (ii) remove water and little or no debris from the at least one cargo compartment;
    at least one buoyant portion of at least one inflow regulator on the vessel free-floating at or near the surface of liquid in the vessel;
    the at least one inflow regulator limiting the water and debris drawn from the body of water into the cargo compartment to primarily debris and water that passes over the at least one buoyant portion of the at least one inflow regulator during debris collection operations; and
    selectively actuating the at least one inflow regulator to adjust the height of the at least one buoyant portion thereof relative to the surface of liquid in the vessel during debris collection operations.

* * * * *